(12) United States Patent
Correnti et al.

(10) Patent No.: US 11,143,521 B2
(45) Date of Patent: Oct. 12, 2021

(54) SYSTEM AND METHOD FOR AIDING RESPONSES TO AN EVENT DETECTED BY A MONITORING SYSTEM

(71) Applicant: Alarm.com Incorporated, Tysons, VA (US)

(72) Inventors: Matthew Daniel Correnti, Reston, VA (US); Charles Richard Alpert, Snoqualmie, WA (US); Aaron Lee Roberts, Centreville, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/725,903

(22) Filed: Dec. 23, 2019

(65) Prior Publication Data

US 2020/0240802 A1 Jul. 30, 2020

Related U.S. Application Data

(63) Continuation of application No. 16/004,150, filed on Jun. 8, 2018, now Pat. No. 10,514,264.

(Continued)

(51) Int. Cl.
*G01C 21/34* (2006.01)
*G01C 21/36* (2006.01)
(Continued)

(52) U.S. Cl.
CPC ....... *G01C 21/3461* (2013.01); *G01C 21/206* (2013.01); *G01C 21/3626* (2013.01);
(Continued)

(58) Field of Classification Search
CPC ............ G01C 21/3461; G01C 21/3694; G01C 21/3626; G01C 21/3647; G01C 21/206;
(Continued)

(56) References Cited

U.S. PATENT DOCUMENTS 7,683,793 B2 3/2010 Li et al.
2005/0190053 A1 9/2005 Dione
(Continued)

OTHER PUBLICATIONS

PCT Notification of Transmittal of the International Search Report and Written Opinion in International Application No. PCT/US2018/036747, dated Aug. 31, 2018, 20 pages.
(Continued)

*Primary Examiner* — Anne Marie Antonucci
(74) *Attorney, Agent, or Firm* — Fish & Richardson P.C.

(57) ABSTRACT

Methods, systems, and apparatus, including computer programs encoded on a storage device are disclosed for generating a map for use in safely navigating hazards detected at a property. One method may include actions of receiving a request for a safe path to a property occupant that is located inside the property, obtaining a floor plan of the property, obtaining real-time sensor data generated by one or more sensors installed at the property that includes (i) sensor data indicative of a hazard at the property and (ii) a current location of the property occupant, generating a map of the property based on (i) the obtained real-time sensor data and (ii) the obtained floor plan, determining a safe path between an exit of the property and the current location of the property occupant, and providing, for output on a user device, the map of the property that visually indicates the safe path.

20 Claims, 7 Drawing Sheets

Related U.S. Application Data

(60) Provisional application No. 62/517,813, filed on Jun. 9, 2017.

(51) Int. Cl.
| | | |
|---|---|---|
| *G08B 7/06* | (2006.01) | |
| *G01C 21/20* | (2006.01) | |
| *G08B 21/02* | (2006.01) | |
| *G08B 17/06* | (2006.01) | |

(52) U.S. Cl.
CPC ..... *G01C 21/3647* (2013.01); *G01C 21/3694* (2013.01); *G08B 7/062* (2013.01); *G08B 7/066* (2013.01); *G08B 21/02* (2013.01); *G08B 17/06* (2013.01)

(58) Field of Classification Search
CPC ........ G08B 7/066; G08B 7/062; G08B 21/02; G08B 17/06; H04W 4/024; H04W 4/33; H04W 4/90; H04W 4/38; H04L 67/12
See application file for complete search history.

(56) References Cited

U.S. PATENT DOCUMENTS

| | | |
|---|---|---|
| 2008/0062167 A1 | 3/2008 | Boggs et al. |
| 2011/0163872 A1 | 7/2011 | Pasveer et al. |
| 2011/0195687 A1 | 8/2011 | Das et al. |
| 2011/0276264 A1 | 11/2011 | Plocher et al. |
| 2013/0169817 A1 | 7/2013 | Jones et al. |
| 2016/0049064 A1* | 2/2016 | McNabb ................ G08B 21/10 340/540 |
| 2017/0032632 A1 | 2/2017 | Joseph et al. |
| 2018/0204428 A1* | 7/2018 | Asaro ................. G01C 21/206 |

OTHER PUBLICATIONS

PCT International Preliminary Report on Patentability in International Application No. PCT/US2018/036747, dated Dec. 19, 2019, 9 pages.

EP Office Action in European Appln. No. 18735112.7, dated Jul. 1, 2021, 10 pages.

* cited by examiner

SYSTEM AND METHOD FOR AIDING RESPONSES TO AN EVENT DETECTED BY A MONITORING SYSTEM

CROSS-REFERENCE TO RELATED APPLICATIONS

This application is a continuation of U.S. application Ser. No. 16/004,150, filed Jun. 8, 2018, now allowed, which claims the benefit of U.S. Provisional Patent Application No. 62/517,813 filed Jun. 9, 2017 and entitled "System and Method for Aiding Responses to an Event Detected by a Monitoring System." Both of these prior applications are incorporated by reference in their entirety.

BACKGROUND

First responders are comprised of the first people to arrive at the scene of an event. First responders may include, for example, police officers, firefighters, medics, and the like. In some instances, the first responders may be walking into harm's way in an effort to help property occupants, property owners, or the like that are present at a property where a potential event is taking place. For example, a first responder may arrive at a property that is on fire with one or more property occupants inside the property. In such situations, the first responder may typically not have any knowledge regarding the layout of the property, safe paths through the property, precise location of property occupants, precise location of hazards within the property (e.g., fires, intruders, or the like).

SUMMARY

Techniques are described for generating a map that can be used to assist first responders in navigating hazards at a property. In one aspect, a monitoring system can process real-time (or near real-time) sensor data and dynamically generate a map of hazards detected at property. Upon request, the monitoring system can automatically determine a safe path through the property and generate a rendering, on a map of the property, of the safe path. A first responder can follow the safe path to get to a property occupant who is located inside the property. Alternatively, the first responder can use a generated safe path to help a property occupant exit the property once the property occupant has been found inside the property. The safe path can be dynamically updated, even after a first responder has entered the property and is following the path, using real-time (or near real-time) sensor data so that the first responder is aware of the current state of hazards when navigating the property.

Though a fire is presented as an example of a hazard, the present disclosure need not be so limited. Instead, a hazard could include anything that presents a danger to a first responder. Such hazards may include floods, broken electrical lines, poisonous gases (e.g., carbon dioxide, carbon monoxide, smoke, etc.), trespassers, or the like.

In one aspect, a monitoring system is disclosed that includes one or more processors and one or more storage devices that include instructions that are operable, when executed by the one or more processors, to cause the one or more processors to perform operations. The operations may include receiving a request for a safe path to a property occupant that is located inside the property, responsive to the request for a safe path to the property occupant that is located inside the property, obtaining a floor plan of the property, obtaining real-time sensor data generated by one or more sensors installed at the property that includes (i) sensor data indicative of one or more hazards at the property and (ii) a current location of the property occupant, generating a map of the property based on (i) the obtained real-time sensor data and (ii) the obtained floor plan, determining, based on the generated map of the property, a safe path between an exit of the property and the current location of the property occupant, and providing, for output on a user device, the map of the property that visually indicates the safe path.

Other aspects include corresponding methods, apparatus, and computer programs to perform actions of methods defined by instructions encoded on computer storage devices.

These and other versions may optionally include one or more of the following features. For instance, in some implementations, the operations may further comprise receiving (i) second sensor data generated by one or more sensors installed at the property or (ii) image data captured by one or more cameras installed at the property, wherein the second sensor data is indicative of a potential event at the property, and transmitting a notification to a device associated with a first responder that notifies the first responder of the occurrence of the potential event.

In some implementations, the operations may further comprise receiving (i) second sensor data generated by one or more sensors installed at a different property than the property or (ii) camera data generated by one or more cameras installed at a different property than the property, and transmitting a notification to a device associated with a first responder that notifies the first responder of the occurrence of the potential event.

In some implementations, the operations may further comprise obtaining image data captured by one or more cameras installed at the property that includes (i) image data depicting one or more hazards at the property or (ii) image data depicting the current location of a property occupant. In such implementations, generating a map of the property based on (i) the obtained real-time sensor data and (ii) the obtained floor plan may include generating a map of the property based on (i) the obtained real-time sensor data, (ii) the obtained image data, and (iii) the obtained floor plan. In such implementations, determining, based on the generated map of the property, a safe path between an exit of the property and the current location of the property occupant may include determining, based on the generated map of the property that is based on (i) the obtained real-time sensor data, (ii) the obtained image data, and (iii) the obtained floor plan, a safe path between an exit of the property and the current location of the property occupant.

In some implementations, generating a map of the property based on (i) the obtained real-time sensor data, (ii) the obtained image data, and (iii) the obtained floor plan may include determining, based on the obtained real-time sensor data from a motion sensor or based on the image data captured by one or more cameras, that a human object is located in a particular location of the property, and projecting a graphical marker representing the human object onto a portion of the map that corresponds to the location of the motion sensor or the location of the camera.

In some implementations, generating a map of the property based on (i) the obtained real-time sensor and (ii) the obtained floor plan may include projecting the obtained real-time sensor data onto the obtained floor plan.

In some implementations, generating a map of the property based on (i) the obtained real-time sensor and (ii) the obtained floor plan may include determining, based on the obtained real-time sensor data, that a particular event is occurring at a particular location inside the property, and projecting a graphical marker representing the particular event onto a portion of the map that corresponds to the location of a sensor that generated the obtained real-time sensor data.

In some implementations, generating a map of the property based on (i) the obtained real-time sensor and (ii) the obtained floor plan may include determining, based on the obtained real-time sensor data from a temperature sensor, that a fire is occurring in a particular location of the property, and projecting a graphical marker representing a fire onto a portion of the map that corresponds to the location of the temperature sensor.

In some implementations, generating a map of the property based on (i) the obtained real-time sensor and (ii) the obtained floor plan may include accessing a monitoring profile that is (i) stored in a database accessible to the monitoring system and (ii) that enables the user device to interface with one or more connected-home controls, and projecting a graphical marker representing at least one connected-home control onto a portion of the map that is proximate to the location of the at least one connected-home control.

In some implementations, determining, based on the generated map of the property, a safe path between an exit of the property and the current location of the property occupant may include determining, for each of a plurality of paths that extend from the current location of the property occupant to an exit of the property, a path score, and selecting, a particular path of the plurality of paths, based on the determined path score.

In some implementations, the path score is based on one or more factors that include (i) a number of hazards detected along the path, (ii) a type of hazard detected upon each path, (iii) a proximity of the hazards to the path, or (iv) a magnitude of the hazard.

DETAILED DESCRIPTION

Figure 1:
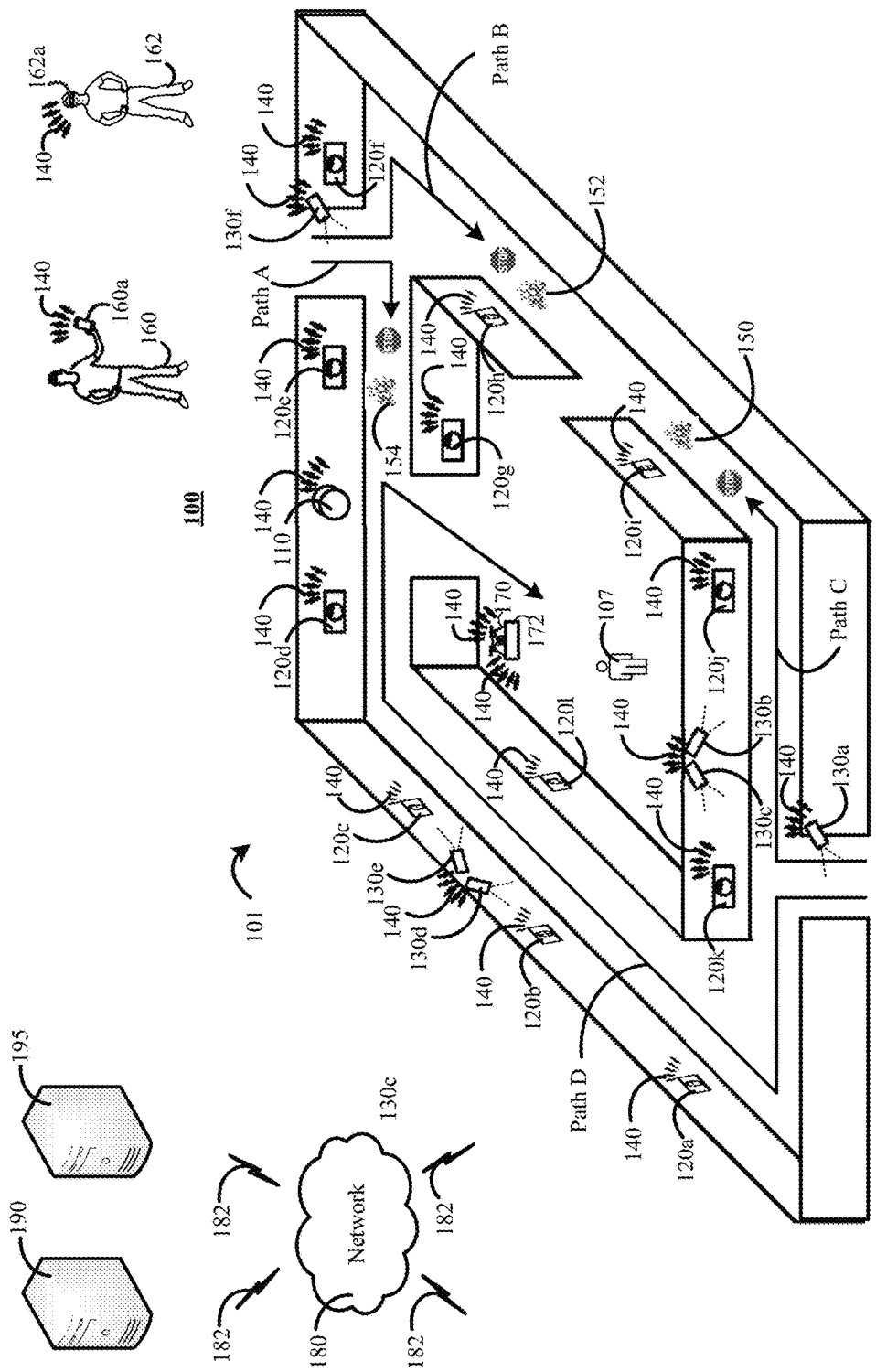
FIG. 1 is a contextual diagram of an example of a connected-home monitoring system that is used to aid a response to an event detected by the connected-home monitoring system.

A system and method is disclosed for aiding a response to a potential event that is detected by a connected-home monitoring system installed at a property. The response to the potential event may include a person responding to address one or more factors that may be the cause of the potential event. Alternatively, the response to the potential event may include a property occupant trying to exit the property in response to the detection of a potential event by the monitoring system.

The system that monitors a property as described in this application is referred to as a connected-home monitoring system. However, the connected-home monitoring system is not limited to "homes." Instead, any type of property including residential, commercial, or industrial properties may be monitored using the "connected-home monitoring system" as described by this specification.

The system and method may include providing access to a connected-home monitoring system to a party that is not the property occupant, property owner, or the like such as a first responder (e.g., police officer, firefighter, or the like). Then, the party that is not the property occupant, property owner, or the like can interact with the connected-home monitoring system until the potential event subsides. Interacting with the connected-home monitoring system may include accessing sensor data, viewing electronic maps of the property that are augmented based on the detected sensor data, unlocking connected locks, turning on connected lights, turning off connected lights, viewing a video feed from a connected camera, controlling a connected drone, or the like.

In some implementations, the system and method may be used to generate a map of the property associated with a potential event. The map may be generated using one or more cameras, a smartphone, an augmented reality device, a virtual reality device, one or more drones, one or more household robots (e.g., a robotic vacuum cleaner). The map may include contextual information that is based on data from one or more motion sensors, one or more temperature sensors, one or more smoke detectors, one or more carbon monoxide sensors, a combination thereof, or the like. The system and method may use the generated map to trace routes through the property, and evaluate the level of safety associated with each respective route based on detected sensor data. In some implementations, the generated map may be presented by a mobile application for display on a mobile device.

In some implementations, the system and method may use generated sensor data to generate a mixed reality model that is associated one or more portions of the property. For example, the user may be equipped with a head-wear device that includes a transparent interface. The transparent interface may include glass. Alternatively, the "transparent" interface may be electronically engineered using a device that includes one or more cameras on a first side of the device to capture a video feed of the area in front of a user and then a graphical user interface display on a second side of the device that outputs a streaming video feed of the area in front of the user on the graphical user interface. The generated mixed reality model may generate visual modifications for display on the transparent interface based on obtained sensor data for the portion of the property associated with the user's location inside the property. For example, a generated mixed reality model may display visual modifications on top of aspects of a property showing a colored gas indicative of the present of carbon monoxide based on sensor data from one or more carbon monoxide sensors. Visual modifications provided on the transparent interface may also include navigational information that is indicative of a safe path through the property based on collected sensor data. In some instances, the mixed reality environment may be an augmented reality environment that graphically overlays visual modifications on top of real-world views of the property. Alternatively, the mixed reality environment may include a virtual reality environment where a user is fully immersed in a completely virtual environment. In yet other implementations, the mixed reality environment may include an artificially generated environment that includes characteristics of both alternative reality and virtual reality.

FIG. 1 is a contextual diagram of an example of a connected-home monitoring system 100 that is used to aid a response to an event detected by a connected-home monitoring system 100.

The connected home monitoring system 100 includes a monitoring system control unit 110, one or more sensors 120a, 120b, 120c, 120d, 120e, 120f, 120g, 120h, 120i, 120j, 120k, 120l, one or more cameras 130a, 130b, 130c 130d, 130c, a network 140, a network 180, one or more communications links 182, a monitoring application server 190, a central alarm station server 195, or the like. The one or more sensors 120a, 120b, 120c, 120d, 120e, 120f, 120g, 120h, 120i, 120j, 120k, 120l may be configured to generate sensor data in response to changes in the environment associated with the sensor. Changes in the environment may include, for example, opening of a door or window, changes in temperature, changes in the presence of moving objects, changes in the presence of smoke (or other gases, e.g., carbon monoxide), or the like.

The generated sensor data may be broadcast via network 140. The network 140 may include one or more of a LAN, a WAN, a cellular network, the Internet, or a combination thereof. The monitoring system control unit 110 may detect and analyze the broadcasted sensor data. Alternatively, the monitoring system control unit 110 may detect and relay the broadcasted sensor data to the monitoring application server 190, central alarm station server 195, or both, via the network 180 for processing and analysis by the monitoring application server 190, the central alarm station server 195, one or more operators having access to the central alarm station server 195, or a combination thereof.

In response to the detection, processing, and analysis of the broadcasted sensor data, the monitoring system control unit 110, the monitoring application server 190, the central alarm station server 195 may trigger an alarm indicative of a potential event at the property 101. Triggering an alarm indicative of a potential event at the property 101 may include, for example, contacting one or more law enforcement agencies and requesting that the one or more law enforcement agencies dispatch agents 160, 162 to the property 101 to investigate the potential event. The dispatched agents 160, 162 can use the system and method of the present disclosure to access the connected-home monitoring system 100 and use data generated by the connected-home monitoring system 100 to aid in the agents' 160, 162 response to the detected event.

With reference to the example of FIG. 1, one or more fires such as fires 150, 152, 154 are burning in the property 101. Based on the presence of the fires 150, 152, 154, one or more sensors 120a, 120b, 120c, 120d, 120e, 120f, 120g, 120h, 120i, 120j, 120k, 120l of the connected-home monitoring system 100 can generate sensor data that is indicative of the likely presence of fires 150, 152, 154. For example, sensors such as temperature sensors 120e, 120h, 120i can generate and broadcast sensor data that is indicative of fast rising temperatures, high temperatures typically associated with a fire, or the like. Alternatively, or in addition, sensors such as smoke sensors 120f, 120j may generate and broadcast sensor data that is indicative of the likely presence of smoke.

The monitoring system control unit 110 may detect the sensor data broadcast by the temperature sensors 120e, 120h, 120i and the smoke detectors 120f, 120j and transmit a message to the monitoring application server 190, the central alarm station server 195, or both. The message may include the sensor data that was generated and broadcast by the temperature sensors 120e, 120h, 120i and the smoke detectors 120f, 120j, data describing the sensor data generated and broadcast by the temperature sensors 120e, 120h, 120i and the smoke detectors 120f, 120j, or the like. In some implementations, the monitoring application server 190 may analyze the data in the received message and determine whether to notify the central alarm station server 195 that a potential event is occurring at the property 101. In such implementations, the central alarm station server 195 may receive the notification, analyze the notification, analyze sensor generated and broadcast by the temperature sensors 120e, 120h, 120i and the smoke detectors 120f, 120j (and received from the monitoring system control unit 110, the monitoring application server, or both), and determine whether to notify one or more law enforcement agencies to investigate the potential event.

In the example of FIG. 1, the central alarm station server 195 may generate and transmit a notification to a fire department serving a geographic region where the property 101 resides in response to a message from the monitoring application server 190 indicating the existence of a potential event at the property 101. The fire department may dispatch one or more agents such as agents 160, 162 to combat the fires 150, 152, 154 at the property 101 and rescue any property occupants such as property occupant 107.

The agent 160 can use a mobile device 160a such as smartphone, tablet, smartwatch, or the like to access the property's 101 connected-home monitoring system 100. For example, the agent 160 may submit a request to access the connected-home monitoring system 100 using a mobile application (or web application accessed via a browser) installed on the mobile device 160a. The request to access the connected-home monitoring system 100 may be submitted at any point in time after the agent 160 is dispatched. For example, the request to access the connected-home monitoring system 100 may be transmitted as the agent 160 is planning to leave the firehouse, during the agent's trip to the property 101, or after the agent 160 arrives at the property 101. Requesting access to the connected-home monitoring system in advance of physically arriving at the property 101 can help the agent 160 begin to plan a strategy to combat the fires 150, 152, 154, plan a strategy to rescue the property occupant 110, a combination thereof, or the like in advance of physically arriving at the property 101.

The monitoring application server 190, the central alarm station server 195, or both may receive the request for access to the connected-home monitoring system 101. In some implementations, the monitoring application server 190, the central alarm station server 195, or both, may first determine whether the connected-home monitoring system 100 is enrolled in an enhanced monitoring program. The enhanced monitoring program may include a subscription-based service that allows third parties such as an agent 160 (or other first responder) to access the connected-home monitoring system 100 during a potential event detected by the connected-home monitoring system 100. If it is determined that the property 101 is enrolled in the enhanced monitoring program, then the monitoring application server 190, the central monitoring server 195, or both may then transmit a message to the agent's 160 device 160a requesting authentication information from the agent.

The agent may provide one or more types of authentication information in response to the request for authentication information. For example, the agent 160 may provide authentication information such as a userid/password, biometric data, an RSA cryptographic key, an RSA cryptographic key and user PIN combination, or the like. The request may be forwarded by the mobile application (or web application accessed via a browser) to the monitoring application server 190, the central alarm station server 195, or both, for verification using the network 140, the network 180, one or more communication links 182, or a combination thereof.

The monitoring application server 190 may evaluate the authentication data received from the agent's 160 device 160a. If the agent 160 is authenticated, the monitoring application server 190 or the central alarm station server 195 may provide, activate, or otherwise make available a monitoring profile that is associated with the property 101 for use on the agent's 160 mobile device 160a. The monitoring profile associated with the property 101 may enable access to the connected-home monitoring system's connected locks, connected lights, or the like. In addition, the monitoring profile may enable the mobile device 160a to receive and display sensor data from sensors installed at the property 101, view camera feeds from cameras installed at the property 101, and the like.

The agent 160 may use mobile application (or web application) to access and interact with the connected-home monitoring system. For example, the agent 160 can use the mobile application to view a video feed using the interface of the mobile device 160 from one or more cameras 130a, 130b, 130c, 130d, 130e, 130f. In this manner, the agent 160 can review one or more video feeds of the inside of the property 101 and (i) evaluate potential hazards such as fires 150, 152, 154, (ii) determine a plan for mitigating the potential hazards such as fires 150, 152, 154, (iii) determine the location of a property occupant 107, (iv) determine plan for rescuing the property occupant 107, (v) a combination thereof, or the like.

Alternatively, or in addition, the agent 160 may use the mobile application to access and interact with other components of the connected-home monitoring system 100 such as connected locks, connected lights, or the like. In some implementations, the mobile application (or web application) installed on the mobile device 160a may use the monitoring profile of the property 101 to provide a graphical user interface that associates a particular label with each connected lock, connected light, or the like of a particular property. In some implementations, the particular labels may identify a portion of the property that is associated with the connected lock, a portion of the property that is associated with the connected light, or the like. For example, the agent 160 may use the mobile application 160a to select an icon associated with a connected light in a kitchen of the property 101. The agent 160 may access the light by selecting an icon displayed by the mobile application in the user interface of the agent's 160 device 160a and labeled as "Kitchen Light." In such instances, the selection of the aforementioned icon may toggle the connected light in the kitchen on or off. The agent may interact with connected cameras, connected locks, other connected lights, the drone 170, or the like in the same manner.

In some implementations, the monitoring application server 190 may access the monitoring profile and use the monitoring profile to generate graphical markers that represent manual controls for display in a map of the property generated by the monitoring application server 190. For example, the monitoring application server 190 can project a graphical marker onto a generated map for display in a location of the map that corresponds to the location of a connected-control for the property. A user can interact with the graphical marker, when displayed in a user interface of a user device, to toggle the status of a connected control form locked to unlocked, unlocked to locked, off to on, on to off, or the like. By way of example, a map may include graphical marker of a light in a portion of a generated map corresponding to a living room of the property. In such instances, a user may interact with the graphical marker of the light, via the user interface of a user device, and use the graphical marker to toggle the light on and off.

In some implementations, the agent 160 can use the mobile application to access historical data associated with the property's 101 connected-home monitoring system 100. The historical data may include, for example, sensor data generated in the lead up to the point in time a potential event was detected at the property 101. In addition, the historical data may include, for example, sensor data generated and detected by the controlled-home monitoring system 100 following the detection of a potential event at the property 101. In both instances (e.g., before/lead-up-to detection of a potential event and following detection of a potential event), the historical data may include data indicative of door openings (e.g., sensor data from contact sensors), door closings (e.g., sensor data from contact sensors), camera feeds, heat spikes (e.g., sensor data from thermostat, temperature sensors, thermometers, or the like), data indicative of motion within the property (e.g., from motion sensors), or the like. Such historical data may provide an overview of activities that occurred in the property prior to, and after, a potential event. Such data may, for example, help the agent 160 determine where people are inside the property 101, which people escaped from the property 101, the state of the controlled-home monitoring system installed at the property 101 after detection of the potential event, or the like. The agent 160 may access such historical data when at the property 101, when en route to the property 101, or from a different property at another remote location.

In some implementations, the connected-home monitoring system 100 may include a drone 170 that can be configured to navigate the property 101, use one or more on-board sensors to evaluate a potential event, use one or more cameras to provide a video feed of the property 101, identify (or engage) one or more intruders, identify (or address) one or more hazards), or the like. In such instances, the agent 160 can use the mobile application (or web application) installed on the mobile device 160a to instruct the drone 170 to launch from the charging station 172 and provide the drone's video feed to the mobile device 160. In some implementations, the drone 172 may autonomously navigate the property 101 and provide a stream of video to the mobile device 160a using one or more drone-mounted cameras via the network 140, the network 180, one or more communication links 182, or a combination thereof. Alternatively, in some implementations, the agent 160 may use the mobile application (or web application) installed on the mobile device to instruct the drone to travel to a particular portion of the property, or the like. Though the drone 170 is described as being a drone that was already associated with the controlled-home monitoring system 100 of the property 101, the present disclosure need not be so limited. For example, the drone 170 may be a drone of the agent 160 that the agent 160 brought to the property 101. In some implementations, the agent's 160 drone can be integrated into the controlled-home monitoring system 100 to perform one or more of the operations described above with respect to drone 170.

In some implementations, the agent 160 can submit a request via the mobile application (or web application) installed on the mobile device 160*a* to generate a path to property occupant 107, a path from the property occupant 107 to safety, or both. Each respective path may be generated in the same manner, as described further below with reference to an entrance path to the property 101.

By way of example, the agent 160 may submit a request using the mobile application (or web application) for a safe path to the property occupant 107 inside the property 101 that is currently on fire. The request may be forwarded by the mobile application (or web application) to the monitoring application server 190. The monitoring application server 190 may obtain (i) a layout of the property and (ii) sensor data generated by one or more sensors 120*a*, 120*b*, 120*c*, 120*d*, 120*e*, 120*f*, 120*g*, 120*h*, 120*i*, 120*j*, 120*k*, 120*l*. The monitoring application server 190 may project the generated sensor data onto the layout of the property 101. Projecting the generated sensor data onto the layout of the property 101 may include, for example, plotting data points obtained from sensor data to one or more particular locations of the property layout.

The application monitoring server 190 may analyze each path of the multiple different paths from each respective entrance to the property 101 to the property occupant's 107 location. The property occupant's 107 location may be received from the property occupant 107 (e.g., via a phone call, via text message from the property occupant's smartphone, smartwatch, or the like, via periodic polling of the property occupant's 107 smartphone, smartwatch, or the like). Alternatively, the property occupant's 107 location may be determined based on the detection of sensor data generated by one or more sensors. For example, a motion sensor 120*l* may generate and broadcast sensor data that is indicative of movement. Accordingly, the monitoring system control unit 110, the monitoring application server 190, the central alarm station server 195, or a combination thereof, may determine, based on the movement data detected by the motion sensor 120*l*, that the property occupant is located in the same room as the motion sensor 120*l*.

Each respective path may be analyzed in view of sensor data obtained from the sensors 120*a*, 120*b*, 120*c*, 120*d*, 120*e*, 120*f*, 120*g*, 120*h*, 120*i*, 120*j*, 120*k*, 120*l* installed at the property 101. For example, the application monitoring server 190 may analyze a first "Path A" from the front door of the property 101 to a property occupant 107. However, the application monitoring server 190 may determine that the "Path A" to the property occupant cannot be traveled by an agent 160 because temperature sensor 120*e* is generating sensor data indicative of high temperatures that may be associated with the presence of a fire.

By way of another example, the application monitoring server 190 may analyze a second "Path B" from the front door of the property 101 to a property occupant 107. However, the application monitoring server 190 may determine that the "Path B" to the property occupant cannot be traveled by an agent 160 because temperature sensor 120*h* is generating sensor data indicative of high temperatures that may be associated with the presence of a fire.

By way of another example, the application monitoring server 190 may analyze a third "Path C" from a back door of the property 101 to a property occupant 107. However, the application monitoring server 190 may determine that the "Path C" to the property occupant cannot be traveled by an agent 160 because temperature sensor 120*i* is generating sensor data indicative of high temperatures that may be associated with the presence of a fire.

By way of another example, the application monitoring server 190 may analyze a fourth path from the back door of the property 101 to the property occupant 107. In this example, the monitoring application server 190 may determine that (i) smoke detectors 120*k*, 120*d* are generating sensor data indicative of the presence of smoke. However, the monitoring application server 190 may also determine that the temperature sensors 120*a*, 120*b*, 120*c* are generating sensor data that is not indicative of the presence of a fire. Accordingly, though monitoring application server 190 has determined that there may be smoke in the hallway along "Path D," "Path D" is determined to be the safest path to the property occupant 107 because there are not currently any fires burning along "Path D."

Therefore, in the example of FIG. 1, the monitoring application server 190 can generate and transmit data to the mobile device 160*a* that recommends "Path D" to the agent 160. In some implementations, the mobile application (or web application) may generate, for display on the user interface of the mobile device 160*a*, a layout of the property 101 that visually identifies "Path D." For example, the mobile application may highlight "Path D" on the displayed layout based on data received from the monitoring application server 190. In some implementations, path lights may be installed throughout the property 101 in electrical outlets. The application monitoring server 190 may transmit one or more instructions to the monitoring system control unit 110 to illuminate path lights along "Path D." Upon entrance to the property 101, the agent 160 can follow the path lights to the property occupant 107.

In some implementations, the monitoring application server 190 may score each respective path through the property 101. The path score may provide an indication of the safety level of the path. The path score may be based on the number of hazards detected along the path, the type of hazards detected upon each path, the proximity of the hazards to the path (e.g., is the hazard on a near side of the wall or is the hazard on an opposite far side of the wall in the adjacent room), or the like. For example, smoke hazards may contribute to a higher path score than fire hazards because a firefighter can navigate through the smoke using an oxygen mask, lights, or a combination thereof. Alternatively, or in addition, the path score may also be based on the magnitude of the hazard. For example, in some instances, a path that is associated with one or more sensors indicating the presence of heavy smoke may result in the generation of a lower path score than a path that is associated with light fires. The monitoring application server 190 may then select a particular path of the plurality of paths through the property based on the path score.

An agent 162 may also be equipped with head-wear 162*a* that provides a transparent interface. The transparent interface may be naturally transparent such as, for example, a piece of glass. Alternatively, the "transparent" interface may be an engineered transparency achieved using one or more cameras. In addition to the transparent interface, the head-wear 162*a* may also include a computing device capable of generating mixed reality environments in the transparent interface. For example, the computing device can generate, for output, visual renderings on top of real-world objects viewed by the agent through the transparent interface. In addition, the head-wear may also include one or more sensors (e.g., heat sensors, smoke detectors, carbon monoxide detectors, motion sensors, or the like). In addition, the head-wear 162a may also include a communication module that is configured to communicate with the monitoring system control unit 110, the monitoring application server 190, the central alarm station server 195, or a combination thereof during an event where the agent 162 has been authenticated.

As the agent 162 entered the property 101, the head-wear 162a may be configured to obtain sensor data from one or more sensors 120a, 120b, 120c, 120d, 120e, 120f, 120g, 120h, 120i, 120j, 120k, 120l of the property 101, obtain the agent's 162 current location within the property, and then generate a mixed reality environment for display on the transparent interface. For example, as the agent 162a enters the property 101 at the back door along "Path D," and walk along "Path D" towards the property occupant 107. The computing device integrated into the head-wear 162a may obtain sensor data from sensors 120a, 120b, 120c and the agent's 162 current location. Then, the computing device integrated into the head-wear 162a may create a mixed reality environment (e.g., an augmented reality environment) by generate visual renderings on the transparent interface to provide an indication of the level of heat associated with the property in the agent's 162 vicinity, within the agent's line of sight, or the like. The visual renderings may include, for example, making hot surfaces red, cold surfaces blue, or the like. The agent 162 may navigate through the property 101 along "Path D" towards the property occupant using the information provided via the mixed reality environment to steer clear of portions of the property 101 whose temperatures have risen to an unsafe level. The computing device integrated into the head-wear 162a can be configured to periodically update the mixed reality environment provided for display on the user interface of the head-wear 162a as the agent 162 moves through the property 101.

In some implementations, the head-wear 162a may obtain data related to materials used in the construction of the property 101. In some implementations, such information may be obtained from a database of materials used in particular properties, used in particular neighborhoods, used by particular builders, or the like. The data obtained and stored in the database of materials may include, for example, an indication of a level of fire resistance associated with the building materials of the property 101. The obtained data may be used to update the state of display. For example, the display may be able to accurately predict the structural integrity of walls, ceilings, floors and the like based on the duration of the fire, the obtained data regarding the building materials used in the property 101, or the like. The head-wear 162a may update the display of the property rendered on the display interface to account portions of the property (e.g. floors, walls, ceilings, or the like) whose structural integrity may be weakening due to fire. Portions of the property whose structural integrity is comprised, or may become comprised a predetermined amount of time in the future, may be visually marked on the display interface of the head-wear 162.

Alternatively, or in addition, the data from the database of materials can be accessed and analyzed by the monitoring application server 190 in view of generated sensor data during the generation of safe paths into the property 101, out of the property 101, or the like. For example, the monitoring application server 190 may determine an amount of time that a floors, walls, ceilings or the like can sustain a particular temperature detected by one or more sensors installed at the property based on the building materials used in the property's 101 construction. In such instances, the monitoring application server 190 may identify a path through the property that is currently safe, and indicate that the path will remain safe for a predetermined amount of time until the building materials used in floors, walls, ceilings, a combination thereof, can no longer sustain the temperatures detected by temperature sensors based on an analysis of (i) data from the building materials database, (ii) sensor data, or (iii) a combination thereof.

In some implementations, the monitoring application server 190 may be configured to eliminate one or more potential paths through the property due to inherent dangers associated with the path. For example, one potentially safe path through the property may extend from the property occupant's 107 current location to a window. In such instances, the monitoring application server 190 may access data associated with the floor plan (e.g., an architects notes, a building blueprint, or the like) that indicates the fall from the window to the ground. The monitoring application server 190 may determine whether the property occupant 107 could survive the fall to the ground. If the monitoring application server 190 determines that the property occupant 107 would likely not survive the fall to the ground, the monitoring application server 190 may (i) eliminate the potential path from as a potential option as an escape path, (ii) lower a path score associated with the path, (iii) or the like.

Figure 2:
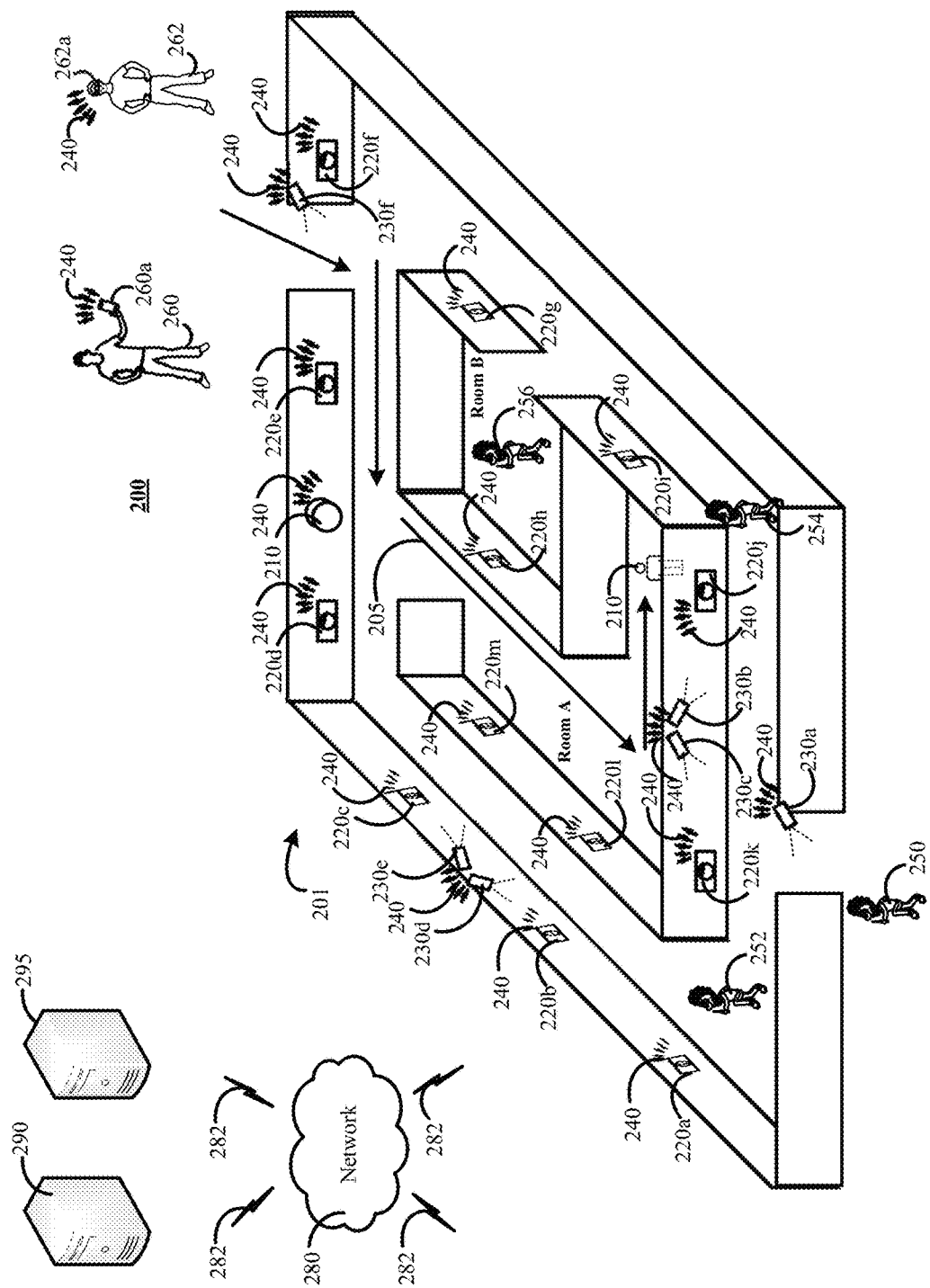
FIG. 2 is another contextual diagram of an example of a connected-home monitoring system that is used to aid a response to an event detected by the connected-home monitoring system.

FIG. 2 is another contextual diagram of an example of a connected-home monitoring system 200 that is used to aid a response to an event detected by a connected-home monitoring system 200.

The connected-home monitoring system 200 installed at the property 201 is similar to the connected-home monitoring system 100. For example, the connected-home monitoring system 200 includes a monitoring system control unit 210, one or more sensors 220a, 220b, 220c, 220d, 220e, 220f, 220g, 220h, 220i, 220j, 220k, 220l, 220m, one or more cameras 230a, 230b, 230c 230d, 230e, a network 240, a network 280, one or more communications links 282, a monitoring application server 290, a central alarm station 295, or the like. The one or more sensors 220a, 220b, 220c, 220d, 220e, 220f, 220g, 220h, 220i, 220j, 220k, 220l, 220m may be configured to generate sensor in response to changes in the environment associated with the sensor. Changes in the environment may include, for example, opening of a door or window, changes in temperature, changes in the presence of moving objects, changes in the presence of smoke (or other gases, e.g., carbon monoxide), or the like.

With reference to the example of FIG. 2, one or more sensors 220a, 220b, 220c, 220d, 220e, 220f, 220g, 220h, 220i, 220j, 220k, 220l, 220m may generate sensor data that is indicative of a home invasion event. For example, the property occupant 207 may have armed the controlled-home monitoring system 200 so that one or more motion sensors 220k, 220j, 220h were active and then one or more of the motion sensors detected movement inside the property 201. The monitoring system control unit 210, monitoring application server 290, or both may detect the generated sensor data and trigger alarm for the potential event.

The monitoring application server 290 may transmit a notification to the central alarm station server 295 based on the potential event. The central alarm station server 295 may dispatch one or more law enforcement agencies such as one or more police officers to the property 201 to investigate the potential break-in. The police officers dispatched to the property may include the agent 260 and the agent 262.

The agent 260 can use a mobile device 260a such as smartphone, tablet, smartwatch, or the like to access the property's 201 connected-home monitoring system 200. For example, the agent 260 may submit a request to access the connected-home monitoring system 200 using a mobile application (or web application accessed via a browser) installed on the mobile device 260a. The request to access the connected-home monitoring system 200 may be submitted at any point in time after the agent 260 is dispatched. For example, the request to access the connected-home monitoring system 200 may be transmitted as the agent 260 is planning to leave the police station, during the agent's trip to the property 201, or after the agent 260 arrives at the property 201. Requesting access to the connected-home monitoring system in advance of physically arriving at the property 201 can help the agent 260 begin to plan a strategy investigate the potential break-in, plan a strategy to rescue the property occupant 207, a combination thereof, or the like, in advance of arriving at the property 201.

The monitoring application server 290, the central alarm station server 295, or both may receive the request for access to the connected-home monitoring system 201. In some implementations, the monitoring application server 290, the central alarm station server 295, or both, may first determine whether the connected-home monitoring system 200 is enrolled in an enhanced monitoring program. The enhanced monitoring program may include a subscription-based service that allows third parties such as an agent 260 (or other first responder) to access the connected-home monitoring system 200 during a potential event detected by the connected-home monitoring system 200. If it is determined that the property 201 is enrolled in the enhanced monitoring program, then the monitoring application server 290, the central monitoring server 295, or both may then transmit a message to the agent's 260 device 260a requesting authentication information from the agent.

The agent may provide one or more types of authentication information in response to the request for authentication information. For example, the agent 260 may provide authentication information such as a userid/password, biometric data, an RSA cryptographic key, an RSA cryptographic key and user PIN combination, or the like. The request may be forwarded by the mobile application (or web application accessed via a browser) to the monitoring application server 290, the central alarm station server 295, or both, for verification using the network 240, the network 280, one or more communication links 282, or a combination thereof.

The monitoring application server 290 may evaluate the authentication data received from the agent's 260 device 260a. If the agent 260 is authenticated, the monitoring application server 290 or the central alarm station server 295 may provide, activate, or otherwise make available a monitoring profile that is associated with the property 201 for use on the agent's 260 mobile device 260a. The monitoring profile associated with the property 201 may enable access to the connected-home monitoring system's connected locks, connected lights, or the like. In addition, the monitoring profile may enable the mobile device 260a to receive and display sensor data from sensors installed at the property 201, view camera feeds from cameras installed at the property 201, and the like.

The agent 260 may use mobile application (or web application) to access and interact with the connected-home monitoring system 200. For example, the agent 260 can use the mobile application to view a video feed using the interface of the mobile device 260 from one or more cameras 230a, 230b, 230c, 230d, 230e, 230f. In this manner, the agent 260 can review one or more video feeds of the inside of the property 201 and (i) determine whether one or more intruders 250, 252, 254, 256 are present in the property, (ii) determine the location of the property occupant 207, (iii) determine a plan for rescuing the property occupant 207, (iv) determine a plan for avoiding or apprehending intruders 250, 252, 254, 256, (v) a combination thereof, or the like.

By way of example, the previously authenticated agent 260 may use the mobile application (or web application) to access to the cameras associated with property 201. In response to the request, the agent 260 may be provided with a user interface that includes an identifier for each camera of the multiple cameras 230a, 230b, 230c, 230d, 230e, 230f installed at the property 201. The identifiers may be obtained from the monitoring profile, and include descriptive names assigned by the property occupant 207, property owner, or the like when setting up the connected-home monitoring system 200. For example, the camera identifiers may include names such as front door, back door, living room, first floor bedroom, second floor bedroom, master bedroom, or the like.

Prior to entering the property 201, the agent 260 may use mobile application (or web application) to access the video feed provided by camera 230a to determine that there is an intruder 250 at the back door. Similarly, the agent may access the camera feeds from cameras 230b and 230c and determine that intruders 252 and 254 are inside the house on opposite sides of back door. In addition, the agent 260 can obtain the video feed from camera 230f and determine that there are no intruders at the front door or at the entrance of Room A. Accordingly, the agent 260 can plan an entrance to the property 201 through the front door that is known to be safe based on the video feeds from cameras 230a, 230b, 230c, 230f.

Alternatively, or in addition, the agent may submit a request for a safe path to the location of the property occupant 207. The request may be forwarded by the mobile application (or web application) to the monitoring application server 190. The monitoring application server 190 may obtain (i) a layout of the property, (ii) sensor data generated by one or more sensors 220a, 220b, 220c, 220d, 220e, 220f, 220g, 220h, 220i, 220j, 220k, 220l, 220m, or the like. In the context of a potential home-invasion (or any other type of potential event), the generated sensor data may provide real-time data that can be used to generate a map of the property and determine a safe path into the property (or out of the property). For examples, motion sensors may provide an indication of portions of the property where movement has most recently occurred, an indication as to the occupancy status of each room of the property, whether or not children are present at the property (e.g., by monitoring location data from a child's smartwatch, smartphone, or the like), whether or not a gun safe has been opened, whether one or more entrance points to the property have been breached, and the like. The monitoring application server 190 may project the generated sensor data onto the layout of the property 201. Projecting the generated sensor data onto the layout of the property 201 may include, for example, plotting data points obtained from sensor data to one or more particular locations of the property layout.

The application monitoring server 290 may analyze each path of the multiple different paths from each respective entrance to the property 201 to the property occupant's 207 location in Room A. The property occupant's 207 location may be received from the property occupant 207 (e.g., via a phone call, via text message from the property occupant's smartphone, smartwatch, or the like, via periodic polling of the property occupant's 207 smartphone, smartwatch, or the like). Alternatively, or in combination the aforementioned ways to locate the property occupant 207, the property occupant's 207 location may be determined based on the detection of sensor data generated by one or more sensors such as motion sensors 220*l*, 220*m*. For example, the property occupant 207 may have indicated in a 911 call that the property occupant was in Room A and real-time motion sensor 120*l* may generate and broadcast sensor data that is indicative of movement in Room A. Accordingly, the agent 260 can use the generated property layout and real-time updates from the motion sensor 120*l* to track the location of the property occupant 207.

The monitoring application server 290 may determine that there is no other movement detected along the path 205 from the front door to the property occupant's location in Room A. In addition, the agent can access the camera 220*f* to determine that there are no intruders between the front door and the entrance to Room A, and provide that feedback to the monitoring application server 290. As a result, the monitoring application server 290 may determine that the path 205 to the property occupant is a safe path to the property occupant 207. In such instances, the agent 260 can enter the property 201 and secure the property occupant without confronting the intruders 250, 252, 254, 256.

While inside the property 201, the agent 260 may analyze the property layout with real-time sensor data projected onto the property layout to determine a safe path out of the property 201. Though the agent 260 is aware of the intruders 250, 252, 254 from the live video feeds streamed to the agent's 260 mobile device 260*a*, the agent 260 may initially be unaware of the presence of intruder 256 who is located in Room B in a camera blindspot. However, the motion sensor 220*h* may detect the intruder's 256 movement, generate sensor data, and broadcast the sensor data in real time indicating movement in Room B. The agent 260 can then request reinforcements to apprehend the intruder in Room B, begin to move out of the property 201 and monitoring intruder's 256 location in Room B by monitoring the output (or lack thereof) of motion sensors 220*g* and 240*i*, or the like.

Accordingly, the agent's 260 access to the components of the connected monitoring system 200 can allow the agent 260 to safely navigate to, secure, and exfiltrate a property occupant 207 that was inside a property 201 during a home invasion.

In some implementations, the agent 262 can assist the agent 260 during the rescue of the property occupant 207. For example, the agent 262 may use head-wear 262*a* that is capable of creating a virtual reality environment based on one or more camera feeds from the property 201. In some implementations, for example, one or more cameras 230*a*, 230*b*, 230*c*, 230*d*, 230*e*, 230*f* may be installed throughout the property 201 in an effort to substantially cover most portions of the property 201. The head-ware 262*a* may be configured to wirelessly communicate with the cameras inside the property 201. In some implementations, the agent 262 may explicitly request a particular video feed from a particular camera of the property 201 that should be displayed on the interface of the head-ware 262*a*. Alternatively, the head-wear may be configured dynamically switch from a first video feed to second video based on the agents 262 head movements, eye movements, or the like.

In such instances, the agent 262 may request access to the controlled-home monitoring system 200 and access one or more of the video feeds from the installed cameras. The agent 262 may virtually navigate the property 201 from outside the property 201 and provide insight to the agent 260 that has entered into the property 201 following Path A to rescue the property occupant 207. In such instances, the agent 262 may, for example, explore one or more or portions of the property 201 to ensure the portion(s) of the property 201 are safe before instruction the agent 260 that it is safe to proceed. For example, the agent 262 may virtually navigate around a corner and inspect that there is no threat before communicating to the agent 260 who may be inside the property 201 that it is safe to proceed around the corner.

The examples described with reference to FIG. 1 and FIG. 2 describe an agent such as a first responder accessing a controlled-home monitoring system in response to emergency events such as a fire and alarm events such as a home invasion. However, the present disclosure need not be limited to such scenarios. Instead, the present disclosure can be used to respond to other types of events in other ways. For example, an elderly property occupant may fall down and not be able to get up. In such instances, connected-home monitoring system may determine that an elderly property occupant is present at the property and then determine that there has been no movement detected for more than a predetermined amount of time. In such instances, an alarm indicative of a potential event may be generated and one or more first responders dispatched. The first responders may request access to the controlled-home monitoring system, authenticate themselves, and unlock doors to the property as they arrive at the property. Then, the first responders may quickly enter the property and assist the elderly person who has fallen.

Figure 3:
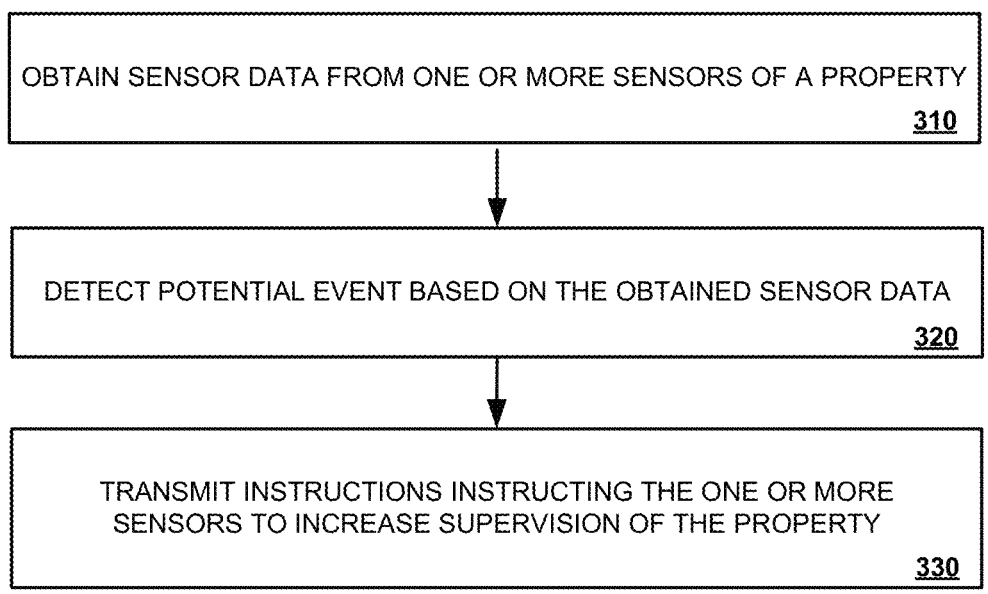
FIG. 3 is a flowchart of an example of a process for increasing the level of supervision performed by a connected-home monitoring system.

FIG. 3 is a flowchart of an example of a process 300 for increasing the level of supervision performed by a connected-home monitoring system. Generally, the process 300 may include obtaining sensor data from one or more sensors of a property (310), detecting a potential event based on the obtained sensor data (320), and transmitting instructions instructing the one or more sensors to increase supervision of the property (330). For convenience, the process 300 will be described below as being performed by a security system such as a connected-home monitoring system 100 or 200 described with reference to FIGS. 1 and 2, respectively.

In more detail, a security system can obtain 310 sensor data from one or more sensors installed at a property. For example, a monitoring application server may receive sensor data detected and relayed by a monitoring system control unit that is installed at the property. Alternatively, the security system may detect sensor data generated and broadcasted by one or sensors installed at the property without the sensor data being relayed through the monitoring system control unit. In such instances, for example, the generated sensor data may be broadcast by the one or more sensors using, for example, a GSM cellular communications module and detected by the security system using a GSM cellular communication module.

The security system can detect 320 a potential event based on the obtained sensor data. For example, the monitoring application server may analyze the sensor data obtained at stage 310 and determine whether the obtained sensor data is indicative of a potential event. For example, the monitoring application server may analyze sensor data generated by a temperature sensor and smoke detector to determine whether the sensor data is indicative of a fire, analyze sensor data generated by a door contact and a motion sensor is indicative of a potential home invasion, or the like.

The security system can transmit 330 instructions instructing the one or more sensors to increase supervision of the property. In some implementations, the monitoring application server may transmit an instruction the monitoring system control unit that instructs the monitoring system control unit to alter the reporting methods of one or more sensors in the property. For example, the sensors within the property may be configured to generate sensor data and broadcast sensor data every minute. However, during a potential event, the monitoring application server may instruct the monitoring system control unit to reduce the minute time period so that one or more of the sensors installed at the property can generate sensor data and broadcast sensor data on a short time interval. In some implementations, for example, the one or more sensors may generate and broadcast sensor data every 6 seconds. The aforementioned time intervals (e.g., one minute, 6 seconds, etc) may be referred to as a sensor reporting window. By reducing the sensor reporting window, the monitoring application server can obtain more detailed sensor data from the security system that is updated in real-time (e.g., every 6 seconds). This detailed information can be projected onto a floor plan of the property and used by a first responder to make decisions in response to a potential emergency event at the property.

Figure 4:
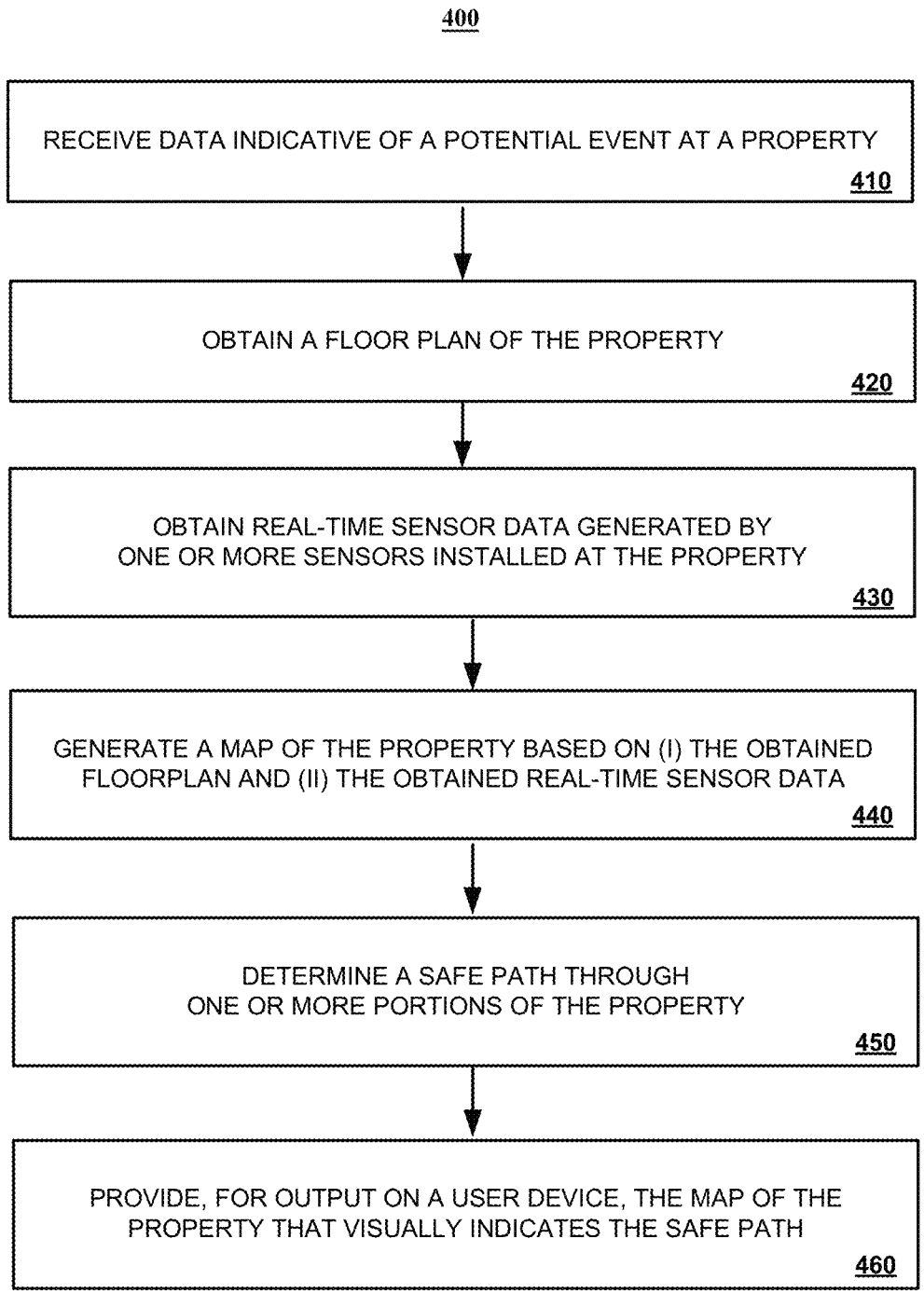
FIG. 4 is a flowchart of an example of a process for generating a path to safety through a property during a potential event.

FIG. 4 is a flowchart of an example of a process 400 for generating a path to safety through a property during a potential event. Generally, the process 400 includes receiving data indicative of a potential event at a property (410), obtaining a floor plan of the property (420), obtaining real-time sensor data generated by one or more sensors installed at the property (430), generating a map of the property based on (i) the obtained floor plan and (ii) the obtained real-time sensor data (440), determining a safe path through one or more portions of the property (450), and providing, for output on a user device, the map of the property that visually indicates the safe path (460). For convenience, the process 400 will be described below as being performed by a security system such as a connected-home monitoring system 100 or 200 described with reference to FIGS. 1 and 2, respectively.

In more detail, the security system can receive 410 data that is indicative of a potential event at a property 410. The data indicative of a potential event may include, for example, sensor data that is generated and broadcast by one or more sensors installed at the property. In such instances, the security system can analyze the sensor data and determine, based on the sensor data, that a potential event is occurring at the property. Alternatively, the data that is indicative of a potential event may include a notification indicative of a potential event from another network component. The other network component may be another network component of the security system, a network component from a different security system, or the like. In some implementations, the data indicative of the potential event may include a property identifier.

In some implementations, data indicative of a potential event at a property may also include receiving one or more messages from a user device requesting a display of a property map showing one or more hazards detected in the property. In some implementations, the request may include a request for the monitoring system to display, on a map of the property, a safe path to a property occupant that is located inside the property. A safe path through the property may include, for example, a path through the property that avoids each detected hazard.

The security system can obtain a floor plan of the property 420. For example, the security system can use property identifying information access a database of floor plans and retrieve a floor plan for the property. In some implementations, the security system may automatically obtain a floor plan of the property in response to the receipt of data that is indicative of a potential event the property. In some implementations, the floor plan may be retrieved from the database using a property identifier that was included in the data received at stage 410. The database of floor plans may include mapping information generated by a drone. Such drone maps may be captured by a property occupant drone and uploaded to the security system. Alternatively, or in addition, the database may be a third party database that stores property mapping information generated by devices sold by the company (e.g., Roomba). Alternatively, or in addition, the database may be a third party database that stores property information (e.g., property layouts) such as Zillow.

The security system can obtain 430 real-time sensor data. For example, a monitoring application server may receive sensor data detected and relayed by a monitoring system control unit that is installed at the property. Alternatively, the security system may detect sensor data generated and broadcasted by one or sensors installed at the property without the sensor data being relayed through the monitoring system control unit. In such instances, for example, the generated sensor data may be broadcast by the one or more sensors using, for example, a GSM cellular communications module and then detected by one or more other components of the security system using a GSM cellular communication module.

The security system can generate 440 a map of the property based on (i) the obtained floor plan and (ii) the obtained real-time sensor data. Generating the map of the property may include, for example, projecting the obtained sensor data onto the map, floor plan, layout, or the like that was obtained at stage 420. Projecting the obtained sensor data onto the layout of the property may include, for example, plotting data points obtained from the sensor data onto the particular locations of the map, floor plan, or layout that are associated with the sensor data. For example, assume a heat sensor in the kitchen of a property is generating sensor data indicative of a potential fire. In such instances, the security system may project a graphical marker onto the floor plan of the property in kitchen where the sensor is located indicating that the sensor is generated data indicative of a fire.

The security system can determine 450 a safe path through one or more portions of the property. Determining a safe path through one or more portions of the property may include analyzing each path of the multiple different paths from each respective entry point to the property (e.g., door, window, or the like) to the property occupant's location in view of obtained sensor data that is associated with the path. Sensor data that is associated with the path may include, for example, obtained sensor data that has been projected onto path defined by an obtained map, layout, floor plan, or the like. Alternatively, determining a safe path through one or more portions of the property may include analyzing each path of multiple different paths from the property occupant's current location to each respective exit point from the property (e.g., door, window, or the like) in view of obtained sensor data that is associated with the path.

In each of the aforementioned examples, the property occupant's location may be received from the property occupant (e.g., via a phone call, via text message from the property occupant's smartphone, smartwatch, or the like, via periodic polling of the property occupant's smartphone, smartwatch, or the like). Alternatively, the property occupant's location may be determined based on the detection of sensor data generated by one or more sensors. For example, a motion sensor may generate and broadcast sensor data that is indicative of movement. Accordingly, the security system may determine, based on the movement data detected by the motion sensor, that the property occupant is located in the same room as the motion sensor detecting movement.

The security system can provide 460, for output on a user device, the map of the property that visually indicates the path to safety. For example, the map may be transmitted to the user device and displayed in a user interface of the user device. Alternatively, the map of the property may be made accessible from a particular website. In such implementations, the user may request access to the map by accessing the particular website using a mobile browser. In some implementations, once the map is output for display in a user interface of the user device, the sensor data provided for display in the map may be periodically updated in real-time by periodically obtaining sensor data in real-time. The map may be updated based on the periodically obtained real-time sensor data. In some implementations, the amount of generated sensor data that is obtained can be increased using the processing of FIG. 3 in order to ensure that the map used by a user to navigate the property is updated and reflects the current hazards identifying by the security system.

Figure 5:
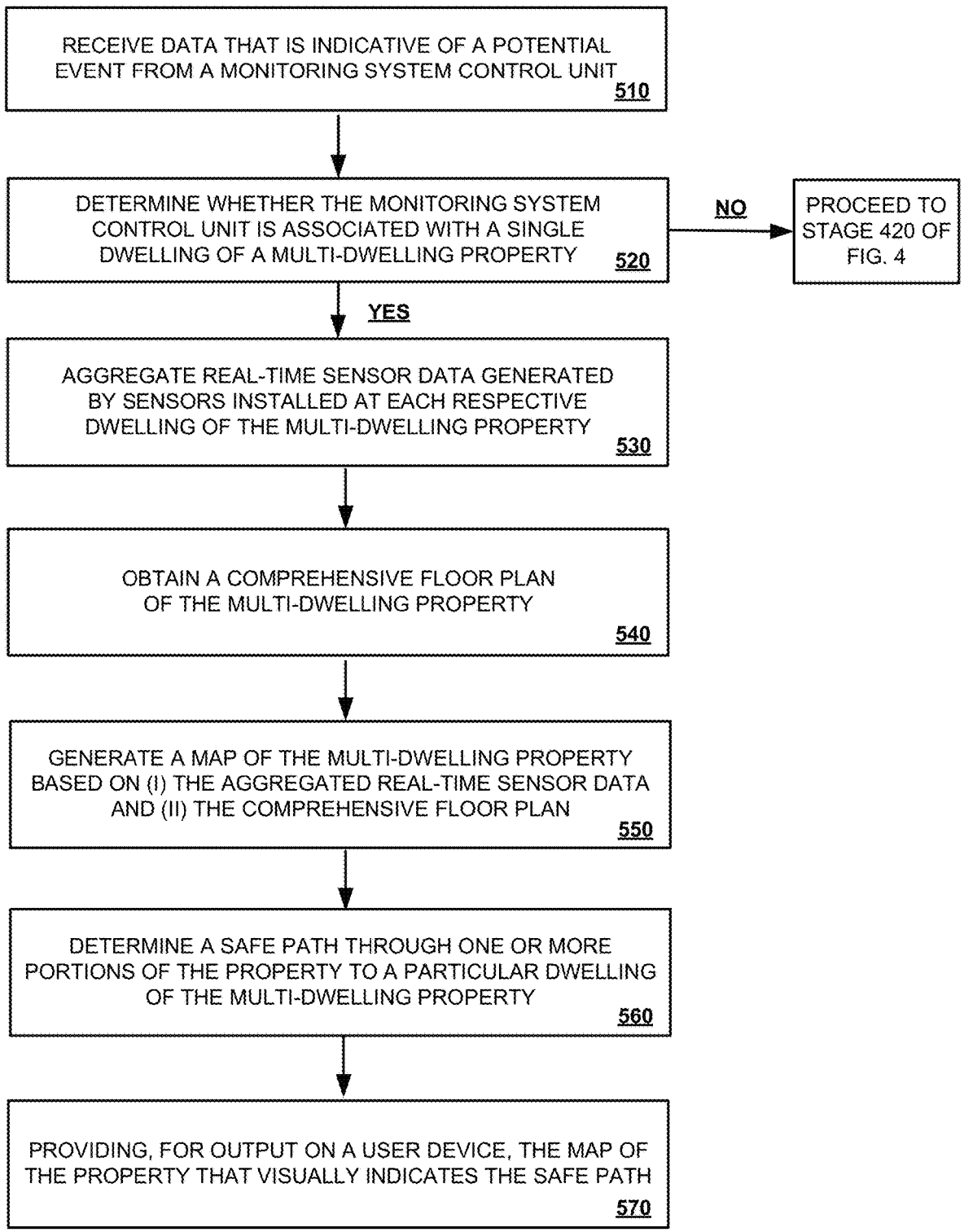
FIG. 5 is a flowchart of an example of a process for aggregating data across multiple different dwellings of a property.

FIG. 5 is a flowchart of an example of a process for aggregating data across multiple different dwellings of a property. Generally, the process 500 may include receiving data that is indicative of a potential event from a monitoring system control unit (510), determining whether the monitoring system control unit is associated with a single dwelling of a multi-dwelling property (520). In response to determine that the monitoring system control unit is not associated with a single dwelling of a multi-dwelling property, then the process 500 continues at by proceeding to stage 420 of FIG. 4. In response to determining that the monitoring system control unit is associated with a single dwelling of a multi-dwelling property, then the process 500 continues by aggregating real-time sensor data generated by sensors installed at each respective dwelling of the multi-dwelling property (530), obtaining a comprehensive floor plan of the multi-dwelling property (540), generating a map of the multi-dwelling property based on (i) the aggregated real-time sensor data and (ii) the comprehensive floor plan (550), determine a safe path through one or more portions of the property to a particular dwelling of the multi-dwelling property (560), and providing, for output on a user device, the map of the property that visually indicates the safe path (570). For convenience, the process 500 is described below as being performed by a security system such as the controlled-home monitoring system 100 or 200, described with reference to FIGS. 1 and 2, respectively.

In more detail, a security system may receive 510 data that is indicative of a potential event from a monitoring system control unit. In some implementations, the data indicative of a potential event may include sensor data generated by one or more sensors installed in a portion of a property monitored by the monitoring system control unit. Alternatively, or in addition, the data indicative of a potential event may include a notification from the monitoring system control unit indicating that the monitoring system control unit has detected a potential event based on sensor data generated by sensors installed at the property. In some implementations, the received data may also include a monitoring system control unit identifier.

The security system may determine 520 whether the monitoring system control unit is associated with a single dwelling of a multi-dwelling property. Determining whether the monitoring system control unit is associated with a single dwelling of a multi-dwelling property may include, for example, generating a search query based on a monitoring system control unit identifier and searching a database of monitoring system control unit data. The database of monitoring system control unit data may include one or more records associated with active monitoring system control unit. The one or more records may include information such as (i) a monitoring system control unit identifier, (ii) the type of dwelling where the monitoring system control unit is installed (e.g., single dwelling (e.g., single-family home), multi-dwelling (e.g., condo complex, apartment building, townhomes, duplex, or the like), etc.), (iii) a dwelling identifier, (iv) information describing the components of the controlled-home monitoring system monitored by the monitoring system control unit, (v) a combination thereof, or the like.

The security system may determine, based on the result of the search of the database of monitoring system control unit data, whether the monitoring system control unit is not associated with a single dwelling of a multi-dwelling property. In response to determining that the monitoring system control unit is not associated with a single dwelling of a multi-dwelling property, then the process 500 continues at stage 420 of FIG. 4. A monitoring system control unit may be determined to not be associated with a single dwelling of a multi-dwelling property if the search results indicate, for example, that the monitoring system control unit is installed in a single-family home.

Alternatively, in response to determining that the monitoring system control unit is associated with a single dwelling of a multi-dwelling property, then the process 500 continues to stage 530. A monitoring system control unit may be determined to be associated with a single dwelling of a multi-dwelling property if the search results indicate, for example, that the monitoring system control unit is installed in a condo unit, an apartment, a townhouse, or the like.

The security system can aggregate 530 real-time sensor data generated by sensors installed at each respective dwelling of the multi-dwelling property. For example, the security system may collectively interpret the sensor data relayed from each respective monitoring system control unit of the multi-dwelling property as a single property. In some implementations, if security system is detecting data indicative of a potential event from a first monitoring system control unit of a single dwelling of a multi-dwelling property, the security system may request a status update from each respective monitoring system control unit installed in the multi-dwelling property. The status update may include, for example, sensor data being generated, or lack thereof from each respective dwelling of the multi-dwelling property. The aggregation of generated sensor data received from each monitoring system control unit of each dwelling of a multi-dwelling property may aid the security system in analyzing the current state of the multi-dwelling property, as a whole.

The security system can obtain 540 a comprehensive map, floor plan, layout or the like of the multi-dwelling property. In some implementations, the security system may be able to retrieve a map, floor plan, layout, or the like for the entire multi-dwelling property. In other implementations, the security system may be required to aggregate individual layouts, floor plans, or the like from two or more respective dwellings of a multi-dwelling property to create a layout, floor plan, or the like for the multi-dwelling property. For example, the security system can use dwelling identifying information to access a database of floor plans and retrieve a floor plan for each dwelling of the multi-dwelling property. In some implementations, the floor plan of each respective dwelling may be retrieved based on dwelling information obtained from the database of monitoring system control unit data described at stage 520. Alternatively, or in addition, one or more dwelling floor plans in the database of floor plans may include mapping information generated by a drone. Such drone maps may be captured by a dwelling occupant's drone and uploaded to the security system. Alternatively, or in addition, the database may be a third party database that stores dwelling mapping information generated by devices sold by the company (e.g., Roomba). Alternatively, or in addition, the database may be a third party database that stores dwelling information (e.g., property layouts) such as Zillow.

The security system can generate 550 a map of the multi-dwelling property based on (i) the aggregated real-time sensor data and (ii) the comprehensive floor plan. Generating the map of the multi-dwelling property may include, for example, projecting the aggregated sensor data from stage 520 onto the map, floor plan, layout, or the like that was obtained at stage 530. Projecting the aggregated sensor data onto the layout of the property may include, for example, plotting data points based on the aggregated sensor data onto particular locations of the map, floor plan, layout, or the like. Data points based on the aggregated sensor data may be plotted onto locations of the map, floor plan, layout, or the like that correspond to the location of the sensor that generated the sensor data that the data point is based on. For example, assume a heat sensor in the kitchen of first dwelling of a property is generating sensor data that is indicative of a potential fire. In such instances, the security system may project a graphical marker onto the floor plan of the multi-dwelling map, floor plan, layout, or the like in the kitchen of the dwelling that includes the sensor that generated the sensor data that is indicative of a fire.

The security system can determine 560 a safe path through one or more portions of the multi-dwelling property. Determining a safe path through one or more portions of the multi-dwelling property may include analyzing each path of the multiple different paths from each respective entry point to the multi-dwelling property (e.g., door, window, or the like) to a particular dwelling occupant's location in view of the aggregated sensor data shown in the map, floor plan, or layout generated at stage 570. Alternatively, determining a safe path through one or more portions of the multi-dwelling property may include analyzing each path of multiple different paths from the property occupant's current location to each respective exit point from the property (e.g., door, window, or the like) in view of obtained sensor data that is associated with the path.

In each of the aforementioned examples, the dwelling occupant's location may be received from the dwelling occupant (e.g., via a phone call, via text message from the dwelling occupant's smartphone, smartwatch, or the like, via periodic polling of the dwelling occupant's smartphone, smartwatch, or the like). Alternatively, the dwelling occupant's location may be determined based on the detection of sensor data generated by one or more sensors. For example, a motion sensor may generate and broadcast sensor data that is indicative of movement. Accordingly, the security system may determine, based on the movement data detected by the motion sensor, that the dwelling occupant is located in the same room as the motion sensor detecting movement.

The security system can provide 570, for output on a user device, the map, floor plan, layout of the like of the multi-dwelling property that visually indicates the safe path. For example, the map may be transmitted to the user device and displayed in a user interface of the user device. Alternatively, the map of the multi-dwelling may be made accessible from a particular website. In such implementations, the user may request access to the map by accessing the particular website using a mobile browser. In some implementations, once the map is output for display in a user interface of the user device, the sensor data provided for display in the map may be periodically updated in real-time by periodically obtaining sensor data in real-time. The map may be updated based on the periodically obtained real-time sensor data. In some implementations, the amount of generated sensor data that is obtained can be increased using the processing of FIG. 3 in order to ensure that the map used by a user to navigate the property is updated and reflects the current hazards identifying by the security system.

Figure 6:
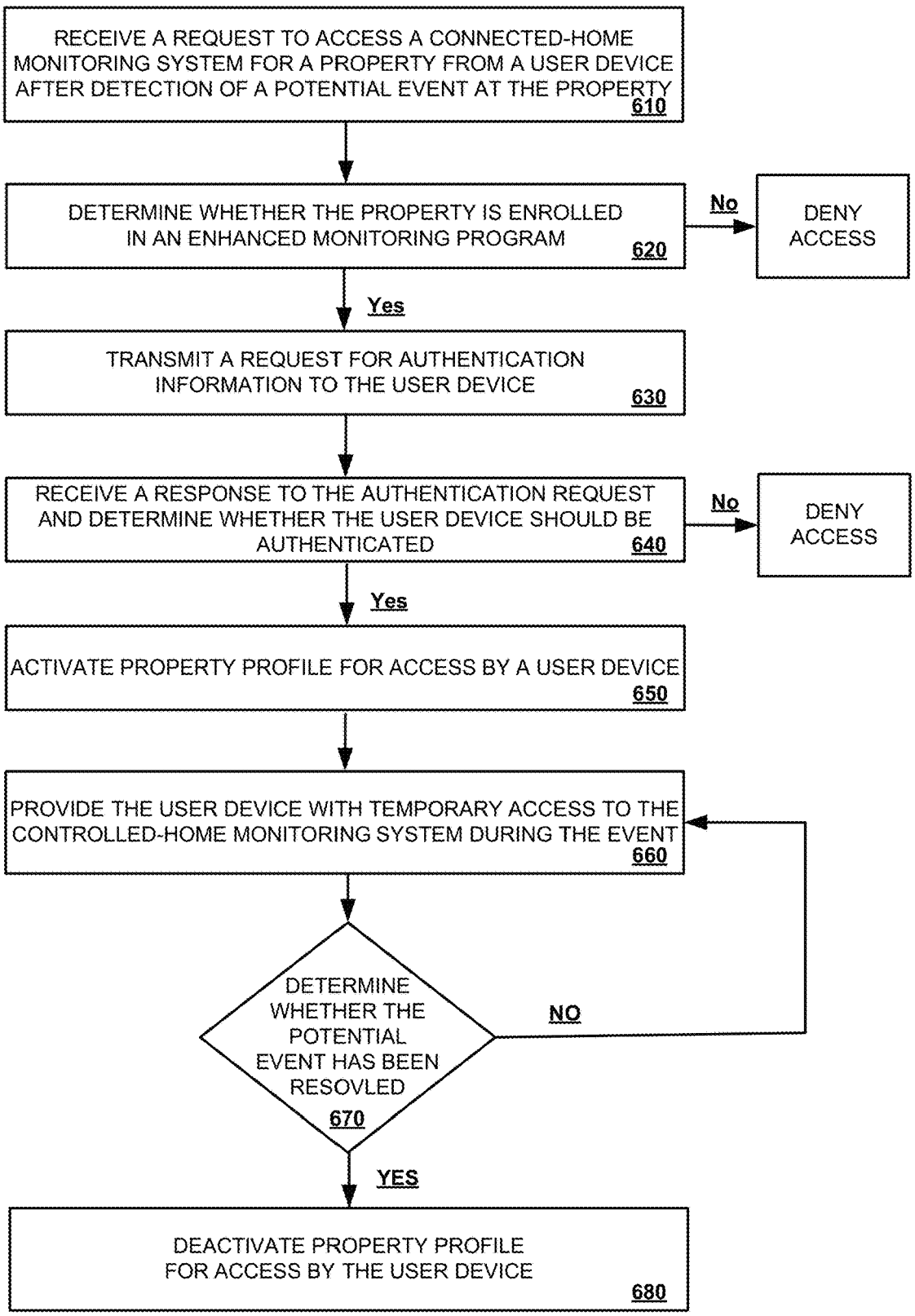
FIG. 6 is a flowchart of an example of a process for providing a third party with access to a connected-home monitoring system associated with a property.

FIG. 6 is a flowchart of an example of a process 600 for providing a third party with access to a connected-home monitoring system associated with a property. Generally, the process 600 includes receiving a request to access a connected-home monitoring system (610), determining whether the property is enrolled in an enhanced monitoring program (620), transmitting a request for authentication information to the user device (630), receiving a response to the authentication request and determining whether the user device should be authenticated (640), activating a property's monitoring profile for access by a user device (650), providing the user device with temporary access to the controlled-home monitoring system during the event (660), and determining whether the event is resolved (670). In response to determining that the event has not been resolved, continuing to provide the user device with temporary access to the controlled-home monitoring system during the event. Alternatively, in response to determining that the event has been resolved, deactivating the property profile for access by the user device (680). For convenience, the process 600 is described below as being performed by a security system such as the controlled-home monitoring system 100 or 200, described with reference to FIGS. 1 and 2, respectively.

In more detail, the security system can receive 610 a request to access a connected-home monitoring system after detection of a potential event at the property. In some implementations, the request may be received from a user device of a first responder such as a law enforcement officers, a firefighter, a medic, or the like. The first responder may request access to the controlled-home monitoring system at any point in time after the detection of a potential event at the property where the controlled-home monitoring system is installed. For example, the first respond may submit the request for access to the connected-home monitoring system as the first responder is planning to leave the first responder's station, during the first responder's trip to the property, or after the first responder arrives at the property.

The security system can determine 620 whether the property is enrolled in an enhanced monitoring program. A property may be enrolled in an enhanced monitoring program if a property occupant, property owner, or the like signed up for access to the enhanced monitoring program. The enhanced monitoring program may include a subscription-based service that a property occupant, property owner, or the like can subscribe to that allows third parties such as a first responder to access the property's connected-home monitoring system during a potential event detected by the connected-home monitoring system. If it is determined that the property is not enrolled in the enhanced monitoring program, the security system will deny the first responder's request for access to the connected-home monitoring system. Alternatively, if it is determined that the property is enrolled in the enhanced monitoring program, then the security system can transmit 630 a request for authentication information form the user device.

The security system can receive 640 a response to the authentication request and determine whether the user device should be authenticated. The response to the authentication request may include one or more types of data that can be used to authenticate the first responder such as a userid/password, biometric data, an RSA cryptographic key, an RSA cryptographic key and user PIN combination, or the like. The authentication response may be evaluated by the security system to determine whether the first responder's authentication information is sufficient to obtain access to the connected-home monitoring system. The first responder's authentication information may be sufficient to obtain access to the connected-home monitoring system if, for example, the authentication satisfies the authentication criteria put in place by the security system (e.g., the user name and password match the user name and password on file for an authorized user, the biometric data sufficiently matches the biometric data on file for an authorized user or the like) for access to the controlled-home monitoring system.

If the security system determines that the user device of the first responder could not be authenticated, the user device of the first responder is denied access to the controlled-home monitoring system. Alternatively, if the system determines that the user device of the first responder can be authenticated, then the security system can activate 650 a property's monitoring profile for access by the user device. The property's monitoring profile may enable the first responder's user device to access the connected-home monitoring system's locks, lights, or the like. Alternatively, or in addition, the property's monitoring profile may enable the mobile device receive and display sensor data from sensors installed at the property, view video feeds from cameras installed at the property, control drone's integrated into the controlled-home monitoring system, or the like.

In some implementations, the user device of the first responder may include a head-wear that includes a display interface that can be used to facilitate generation of a mixed reality environment. The generated mixed reality model may generate visual modifications for display on the display interface of the head-wear based on obtained sensor data for the portion of the property associated with the user's location inside the property. For example, a generated mixed reality model may display visual modifications on top of aspects of a property showing a colored gas indicative of the present of carbon monoxide based on sensor data from one or more carbon monoxide sensors. Visual modifications provided on the display interface may also include navigational information that is indicative of a safe path through the property based on collected sensor data. In some instances, the mixed reality environment may be an augmented reality environment that graphically overlays visual modifications on top of real-world views of the property. Alternatively, the mixed reality environment may include a virtual reality environment where a user is fully immersed in a completely virtual environment. In some implementations, the amount of generated sensor data that is obtained and used to generate the mixed reality environments can be increased using the process of FIG. 3 in order to ensure that the mixed reality environment generated by the head-wear is consistent with the real-time data being detected by the sensors installed at the property.

The security system can provide 660 the user device with temporary access to the controlled-home monitoring system. In some implementations, the temporary duration of access to the controlled-home monitoring system that is granted to the user device of the first responder may be tied to the duration of the potential event that is occurring at the property. The duration of the potential event may include, for example, a period of time where one or more sensors is generated sensor data that is indicative of a potential event. Alternatively, or in addition, the duration of the potential event may include, for example, a period of time where a monitoring control unit, monitoring application server, or the like is generating, transmitting, or both notifications that indicate that a potential event is occurring at the property. Alternatively, in other implementations, the temporary duration of access may be provided for a predetermined amount of time.

The security system can determine 670 whether the potential event has been resolved. If the potential event has not yet been resolved, then the system continues to provide the user device of the first responder with temporary access to the controlled-home monitoring system during the event. Alternatively, if it is determined that the potential event has been resolved, the security system may deactivate the property profile for access by the user device (680). Deactivating the property profile for access by the user device of the first responder immediately cuts off access to the connected-home monitoring system by the user device of the first responder. Future access by the user device of the first responder will not be permitted unless a subsequent potential event is detected, a subsequent request for access to the connected-home monitoring system is received by the security system, and the user device of the first responder is subsequently authenticated.

Figure 7:
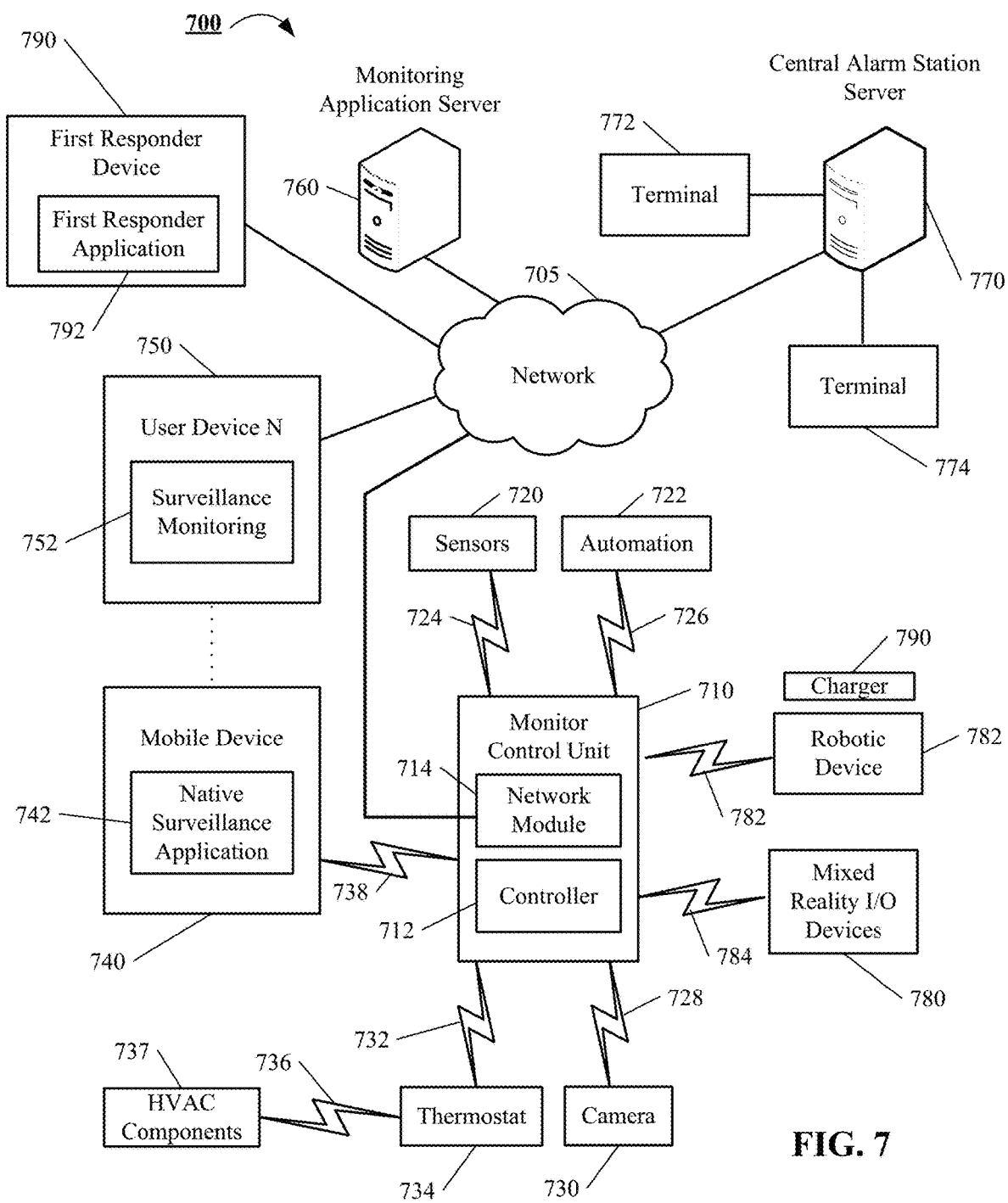
FIG. 7 is block diagram of system components that can be used to aid a response to an event detected by a connected-home monitoring system.

FIG. 7 is block diagram of system 700 of components that can be used to aid a response to an event detected by a connected-home monitoring system.

FIG. 7 illustrates an example of an electronic system 700 configured to provide surveillance and reporting. The electronic system 700 includes a network 705, a monitoring system control unit 710, one or more user devices 740, 750, a monitoring application server 760, and a central alarm station server 770. In some examples, the network 705 facilitates communications between the monitoring system control unit 710, the one or more user devices 740, 750, the monitoring application server 760, and the central alarm station server 770.

The network 705 is configured to enable exchange of electronic communications between devices connected to the network 705. For example, the network 705 may be configured to enable exchange of electronic communications between the monitoring system control unit 710, the one or more user devices 740, 750, the monitoring application server 760, and the central alarm station server 770. The network 705 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 705 may include multiple networks or subnetworks, each of which may include, for example, a wired or wireless data pathway. The network 705 may include a circuit-switched network, a packet-switched data network, or any other network able to carry electronic communications (e.g., data or voice communications). For example, the network 705 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 705 may include one or more networks that include wireless data channels and wireless voice channels. The network 705 may be a wireless network, a broadband network, or a combination of networks including a wireless network and a broadband network.

The monitoring system control unit 710 includes a controller 712 and a network module 714. The controller 712 is configured to control a monitoring system (e.g., a home alarm or security system) that includes the monitoring system control unit 710. In some examples, the controller 712 may include a processor or other control circuitry configured to execute instructions of a program that controls operation of an alarm system. In these examples, the controller 712 may be configured to receive input from sensors, detectors, or other devices included in the alarm system and control operations of devices included in the alarm system or other household devices (e.g., a thermostat, an appliance, lights, etc.). For example, the controller 712 may be configured to control operation of the network module 714 included in the monitoring system control unit 710.

The network module 714 is a communication device configured to exchange communications over the network 705. The network module 714 may be a wireless communication module configured to exchange wireless communications over the network 705. For example, the network module 714 may be a wireless communication device configured to exchange communications over a wireless data channel and a wireless voice channel. In this example, the network module 714 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 714 also may be a wired communication module configured to exchange communications over the network 705 using a wired connection. For instance, the network module 714 may be a modem, a network interface card, or another type of network interface device. The network module 714 may be an Ethernet network card configured to enable the monitoring system control unit 710 to communicate over a local area network and/or the Internet. The network module 714 also may be a voiceband modem configured to enable the alarm panel to communicate over the telephone lines of Plain Old Telephone Systems (POTS).

The monitoring system that includes the monitoring system control unit 710 includes one or more sensors or detectors. For example, the monitoring system may include multiple sensors 720. The sensors 720 may include a contact sensor, a motion sensor, a glass break sensor, or any other type of sensor included in an alarm system or security system. The sensors 720 also may include an environmental sensor, such as a temperature sensor, a water sensor, a rain sensor, a wind sensor, a light sensor, a smoke detector, a carbon monoxide detector, an air quality sensor, etc. The sensors 720 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 720 may include a radio-frequency identification (RFID) sensor that identifies a particular article that includes a pre-assigned RFID tag.

The monitoring system control unit 710 communicates with the module 722 and the camera 730 to perform surveillance or monitoring. The module 722 is connected to one or more devices that enable home automation control. For instance, the module 722 may be connected to one or more lighting systems and may be configured to control operation of the one or more lighting systems. Also, the module 722 may be connected to one or more electronic locks at the property and may be configured to control operation of the one or more electronic locks (e.g., control Z-Wave locks using wireless communications in the Z-Wave protocol. Further, the module 722 may be connected to one or more appliances at the property and may be configured to control operation of the one or more appliances. The module 722 may include multiple modules that are each specific to the type of device being controlled in an automated manner. The module 722 may control the one or more devices based on commands received from the monitoring system control unit 710. For instance, the module 722 may cause a lighting system to illuminate an area to provide a better image of the area when captured by a camera 730.

The camera 730 may be a video/photographic camera or other type of optical sensing device configured to capture images. For instance, the camera 730 may be configured to capture images of an area within a building monitored by the monitoring system control unit 710. The camera 730 may be configured to capture single, static images of the area and also video images of the area in which multiple images of the area are captured at a relatively high frequency (e.g., thirty images per second). The camera 730 may be controlled based on commands received from the monitoring system control unit 710.

The camera 730 may be triggered by several different types of techniques. For instance, a Passive Infra Red (PIR) motion sensor may be built into the camera 730 and used to trigger the camera 730 to capture one or more images when motion is detected. The camera 730 also may include a microwave motion sensor built into the camera and used to trigger the camera 730 to capture one or more images when motion is detected. The camera 730 may have a "normally open" or "normally closed" digital input that can trigger capture of one or more images when external sensors (e.g., the sensors 720, PIR, door/window, etc.) detect motion or other events. In some implementations, the camera 730 receives a command to capture an image when external devices detect motion or another potential alarm event. The camera 730 may receive the command from the controller 712 or directly from one of the sensors 720.

In some examples, the camera 730 triggers integrated or external illuminators (e.g., Infra Red, Z-wave controlled "white" lights, lights controlled by the module 722, etc.) to improve image quality when the scene is dark. An integrated or separate light sensor may be used to determine if illumination is desired and may result in increased image quality.

The camera 730 may be programmed with any combination of time/day schedules, system "arming state", or other variables to determine whether images should be captured or not when triggers occur. The camera 730 may enter a low-power mode when not capturing images. In this case, the camera 730 may wake periodically to check for inbound messages from the controller 712. The camera 730 may be powered by internal, replaceable batteries if located remotely from the monitoring control unit 710. The camera 730 may employ a small solar cell to recharge the battery when light is available. Alternatively, the camera 730 may be powered by the controller's 712 power supply if the camera 730 is co-located with the controller 712.

In some implementations, the camera 730 communicates directly with the monitoring application server 760 over the Internet. In these implementations, image data captured by the camera 730 does not pass through the monitoring system control unit 710 and the camera 730 receives commands related to operation from the monitoring application server 760.

The system 700 also includes thermostat 734 to perform dynamic environmental control at the property. The thermostat 734 is configured to monitor temperature and/or energy consumption of an HVAC system associated with the thermostat 734, and is further configured to provide control of environmental (e.g., temperature) settings. In some implementations, the thermostat 734 can additionally or alternatively receive data relating to activity at a property and/or environmental data at a property, e.g., at various locations indoors and outdoors at the property. The thermostat 734 can directly measure energy consumption of the HVAC system associated with the thermostat, or can estimate energy consumption of the HVAC system associated with the thermostat 734, for example, based on detected usage of one or more components of the HVAC system associated with the thermostat 734. The thermostat 734 can communicate temperature and/or energy monitoring information to or from the monitoring system control unit 710 and can control the environmental (e.g., temperature) settings based on commands received from the monitoring system control unit 710.

In some implementations, the thermostat 734 is a dynamically programmable thermostat and can be integrated with the monitoring system control unit 710. For example, the dynamically programmable thermostat 734 can include the monitoring system control unit 710, e.g., as an internal component to the dynamically programmable thermostat 734. In addition, the monitoring system control unit 710 can be a gateway device that communicates with the dynamically programmable thermostat 734.

A module 737 is connected to one or more components of an HVAC system associated with a property, and is configured to control operation of the one or more components of the HVAC system. In some implementations, the module 737 is also configured to monitor energy consumption of the HVAC system components, for example, by directly measuring the energy consumption of the HVAC system components or by estimating the energy usage of the one or more HVAC system components based on detecting usage of components of the HVAC system. The module 737 can communicate energy monitoring information and the state of the HVAC system components to the thermostat 734 and can control the one or more components of the HVAC system based on commands received from the thermostat 734.

In some examples, the system 700 further includes one or more robotic devices 782. The robotic devices 782 may be any type of robots that are capable of moving and taking actions that assist in security monitoring. For example, the robotic devices 782 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices 782 may be robotic devices that are intended for other purposes and merely associated with the monitoring system 700 for use in appropriate circumstances. For instance, a robotic vacuum cleaner device may be associated with the monitoring system 700 as one of the robotic devices and may be controlled to take action responsive to monitoring system events.

In some examples, the robotic devices 782 automatically navigate within a property. In these examples, the robotic devices 782 include sensors and control processors that guide movement of the robotic devices 782 within the property. For instance, the robotic devices 782 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 782 may include control processors that process output from the various sensors and control the robotic devices 782 to move along a path that reaches the desired destination and avoids obstacles. In this regard, the control processors detect walls or other obstacles in the property and guide movement of the robotic devices 782 in a manner that avoids the walls and other obstacles.

In addition, the robotic devices 782 may store data that describes attributes of the property. For instance, the robotic devices 782 may store a floorplan and/or a three-dimensional model of the property that enables the robotic devices 782 to navigate the property. During initial configuration, the robotic devices 782 may receive the data describing attributes of the property, determine a frame of reference to the data (e.g., a home or reference location in the property), and navigate the property based on the frame of reference and the data describing attributes of the property. Further, initial configuration of the robotic devices 782 also may include learning of one or more navigation patterns in which a user provides input to control the robotic devices to perform a specific navigation action (e.g., fly to an upstairs bedroom and spin around while capturing video and then return to a home charging base). In this regard, the robotic devices may learn and store the navigation patterns such that the robotic devices may automatically repeat the specific navigation actions upon a later request.

In some examples, the robotic devices 782 may include data capture and recording devices. In these examples, the robotic devices 782 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices to take and store a biometric sample that can be used to identify the person (e.g., a biometric sample with DNA that can be used for DNA testing).

The robotic devices 782 also may include a communication module that enables the robotic devices to communicate with the monitoring system control unit 710, each other, and/or other devices. The communication module may be a wireless communication module that allows the robotic devices to communicate wirelessly. For instance, the communication module may be a Wi-Fi module that enables the robotic devices to communicate over a local wireless network at the property. The communication module further may be a 900 MHz wireless communication module that enables the robotic devices to communicate directly with the monitoring system control unit 710. Other types of short-range wireless communication protocols, such as Bluetooth, Bluetooth LE, Zwave, Zigbee, etc., may be used to allow the robotic devices to communicate with other devices in the property.

The robotic devices 782 further may include processor and storage capabilities. The robotic devices may include any suitable processing devices that enable the robotic devices to operate applications and perform the actions described throughout this disclosure. In addition, the robotic devices may include solid state electronic storage that enables the robotic devices to store applications, configuration data, collected sensor data, and/or any other type of information available to the robotic devices 782.

The robotic devices 782 are associated with one or more charging stations 790. The charging stations 790 may be located at predefined home base or reference locations in the property. The robotic devices 782 may be configured to navigate to the charging stations 790 after completion of tasks needed to be performed for the monitoring system 700. For instance, after completion of a monitoring operation or upon instruction by the monitoring system control unit 710, the robotic devices 782 may be configured to automatically fly to and land on one of the charging stations. In this regard, the robotic devices 782 may automatically maintain a fully charged battery in a state in which the robotic devices 782 are ready for use by the monitoring system 700.

The charging stations 790 may be contact based charging stations and/or wireless charging stations. For contact based charging stations, the robotic devices 782 may have readily accessible points of contact that the robotic devices are capable of positioning and mating with a corresponding contact on the charging station. For instance, a helicopter type robotic device may have an electronic contact on a portion of its landing gear that rests on and mates with an electronic pad of a charging station when the helicopter type robotic device 782 lands on the charging station. The electronic contact on the robotic device 782 may include a cover that opens to expose the electronic contact when the robotic device is charging and closes to cover and insulate the electronic contact when the robotic device 782 is in operation.

For wireless charging stations, the robotic devices may charge through a wireless exchange of power. In these cases, the robotic devices need only locate themselves closely enough to the wireless charging stations for the wireless exchange of power to occur. In this regard, the positioning needed to land at a predefined home base or reference location in the property may be less precise than with a contact based charging station. Based on the robotic devices landing at a wireless charging station, the wireless charging station outputs a wireless signal that the robotic devices receive and convert to a power signal that charges a battery maintained on the robotic devices.

In some implementations, each of the robotic devices 782 has a corresponding and assigned charging station 790 such that the number of robotic devices equals the number of charging stations. In these implementations, the robotic devices always navigate to the specific charging station assigned to that robotic device. For instance, the robotic device may always use changing station and the robotic device may always use changing station.

In some examples, the robotic devices 782 may share charging stations 790. For instance, the robotic devices may use one or more community charging stations that are capable of charging multiple robotic devices. The community charging station may be configured to charge multiple robotic devices in parallel. The community charging station may be configured to charge multiple robotic devices in serial such that the multiple robotic devices take turns charging and, when fully charged, return to a predefined home base or reference location in the property that is not associated with a charger. The number of community charging stations may be less than the number of robotic devices.

Also, the charging stations 790 may not be assigned to specific robotic devices 782 and may be capable of charging any of the robotic devices 782. In this regard, the robotic devices may use any suitable, unoccupied charging station when not in use. For instance, when one of the robotic devices has completed an operation or is in need of battery charge, the monitoring system control unit 710 references a stored table of the occupancy status of each charging station and instructs the robotic device to navigate to the nearest charging station that is unoccupied.

The system 700 further includes one or more mixed reality devices 780. The one or more mixed reality devices 780 may include any type of device allowing a user to immerse themselves in an environment that simulates a physical presence in one or more places. For instance, the one or more virtual reality devices 780 may include an input/output interface that allows a user to interact with the environment. The one or more virtual reality devices 780 may include output devices for providing sensory experience to the user, such as displays and speakers, and input devices for controlling one or more aspects of the experience based on user input, such as sensors and mechanical controls (e.g., buttons). For example, the one or more mixed reality devices 780 may include one or more wearable virtual reality head-mounted displays or headsets that may be worn by a user.

In some implementations, the one or more mixed reality devices 780 may simulate a physical presence in one or more places located within or around a property monitored by system 700. The one or more mixed reality devices 780 may provide a user with this experience by communicating with one or more components of system 700, such as sensors 720, module 722, and camera 730. For instance, a user may be able to view a live feed from camera 730 on a display of a virtual reality head-wear worn by the user. In some implementations, the virtual reality head-wear may monitor data from one or more accelerometers included in the virtual reality head-wear 780 and control panning, tilting, and/or zooming functions of camera 730 based on the user's head movements. This may allow for synchronous movement of camera 730 and the virtual reality head-wear 780 as positioned on the user's head, which may provide the user with the sensation of physical presence within the area monitored by camera 730. The virtual reality head-wear may provide one or more control signals to camera 730 such that it tilts and pans with movement of the user's head. Zoom functions of camera 730 may be controlled in accordance with leaning movements of the user's head. In some implementations, the virtual reality headset 780 may determine a positioning of the user's head in three-dimensional space and control movement of camera 730 along each axis in accordance with Denavit-Hartenberg parameters.

In some implementations, the mixed reality headset 780 may control zoom functions of camera 730 based on the user's eye movements as detected by a camera integral with the mixed reality headset 780. In these implementations, the mixed reality headset 780 may determine that the user's eyes are focused on a particular portion of its display and/or object depicted in an image of its display and, in response, provide camera 730 with the control signals necessary to zoom into the user's area of interest. In these implementations, the virtual reality device 780 may "lock-onto" an object included in images provided by camera 730 in response to determining that the user has shown a relatively high degree of interest in the object. For instance, the mixed reality device 780 may identify one or more objects included in the images of camera 730 and track the user's gaze to determine if the user's eyes have consistently followed one of the identified objects. The mixed reality headset 780 may control camera 730 such that it continuously tracks these objects of interest.

In some examples, the one or more mixed reality devices 780 may simulate a physical navigation of one or more places located within or around the property monitored by system 700. For instance, if the property includes multiple cameras 730, an mixed reality headset 780 may seamlessly transition from feed-to-feed to simulate a traversal of an area monitored by a series of cameras 730. The user may be able to pan, tilt, and zoom each camera 730, as described above, as well as "walk" through the environment using one or more directional controls provided by head movement or tactile input, for example. That is, the mixed reality headset 780 may coordinate movements of cameras 730 and the feed provided for display for the user, based on the user's movements, directional input, and the location of each camera 730, to simulate movement and translate the user's vantage point. For example, this may allow a user to investigate a potential threat on their property from a remote location. When utilized in combination with the "lock-on" feature described above, a user may be able to follow a moving object located within or around the property.

The sensors 720, the module 722, the camera 730, the thermostat 734, the virtual reality devices 780, and the holographic projectors 782 communicate with the controller 712 over communication links 724, 726, 728, 732, 784, and 786. The communication links 724, 726, 728, 732, 784, and 786 may be a wired or wireless data pathway configured to transmit signals from the sensors 720, the module 722, the camera 730, the thermostat 734, the virtual reality devices 780, and the holographic projectors 782 to the controller 712. The sensors 720, the module 722, the camera 730, the thermostat 734, the virtual reality devices 780, and the holographic projectors 782 may continuously transmit sensed values to the controller 712, periodically transmit sensed values to the controller 712, or transmit sensed values to the controller 712 in response to a change in a sensed value.

The communication links 724, 726, 728, 732, 784, and 786 may include a local network. The sensors 720, the module 722, the camera 730, the thermostat 734, the virtual reality devices 780, and the holographic projectors 782 and the controller 712 may exchange data and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 760 is an electronic device configured to provide monitoring services by exchanging electronic communications with the monitoring system control unit 710, the one or more user devices 740, 750, and the central alarm station server 770 over the network 705. For example, the monitoring application server 760 may be configured to monitor events (e.g., alarm events) generated by the monitoring system control unit 710. In this example, the monitoring application server 760 may exchange electronic communications with the network module 714 included in the monitoring system control unit 710 to receive information regarding events (e.g., alarm events) detected by the monitoring system control unit 110. The monitoring application server 760 also may receive information regarding events (e.g., alarm events) from the one or more user devices 740, 750.

In some examples, the monitoring application server 760 may route alarm data received from the network module 714 or the one or more user devices 740, 750 to the central alarm station server 770. For example, the monitoring application server 760 may transmit the alarm data to the central alarm station server 770 over the network 705.

The monitoring application server 760 may store sensor and image data received from the monitoring system and perform analysis of sensor and image data received from the monitoring system. Based on the analysis, the monitoring application server 760 may communicate with and control aspects of the monitoring system control unit 710 or the one or more user devices 740, 750.

The monitoring application server 760 may be configured to detect the occurrence of a potential event and receive requests from a first responder device 790 for access to one or more components of the system 700. The monitoring application server 760 may determine whether a first responder device can access one or more components of the system 700, and provide the first responder device 790 with access to the property's monitoring profile. The monitoring application server 760 may receive requests for a map of the property where the monitor control unit 710, sensors 720, cameras 730, thermostat 740, connected locks, and connected lights are installed. Alternatively, or in addition, the monitoring application server 760 may receive requests for safe paths through one or more portions of a property where the monitor control unit 710, sensors 720, cameras 730, thermostat 740, connected locks, and connected lights are installed. The monitoring application server 760 can evaluate one or more potential paths through a property based on sensor data collected from the property. The monitoring application server 760 may then determine, and provide, one or more paths through the property based on the evaluated sensor data. In some implementations, the monitoring application server 760 may generate a map of the property that includes visual renderings of the safest path through the property and provide to the first responder device 790 for viewing using the first responder application. The monitoring application server 760 may periodically obtain real-time sensor data that can be used to periodically update the state of the map viewed by the first responder application. In some implementations, obtaining real-time sensor data may also include obtaining near real-time sensor data.

The central alarm station server 770 is an electronic device configured to provide alarm monitoring service by exchanging communications with the monitoring system control unit 710, the one or more mobile devices 740, 750, and the monitoring application server 760 over the network 705. For example, the central alarm station server 770 may be configured to monitor alarm events generated by the monitoring system control unit 710. In this example, the central alarm station server 770 may exchange communications with the network module 714 included in the monitoring system control unit 710 to receive information regarding alarm events detected by the monitoring system control unit 710. The central alarm station server 770 also may receive information regarding alarm events from the one or more mobile devices 740, 750 and/or the monitoring application server 760.

The central alarm station server 770 is connected to multiple terminals 772 and 774. The terminals 772 and 774 may be used by operators to process alarm events. For example, the central alarm station server 770 may route alarm data to the terminals 772 and 774 to enable an operator to process the alarm data. The terminals 772 and 774 may include general-purpose computers (e.g., desktop personal computers, workstations, or laptop computers) that are configured to receive alarm data from a server in the central alarm station server 770 and render a display of information based on the alarm data. For instance, the controller 712 may control the network module 714 to transmit, to the central alarm station server 770, alarm data indicating that a sensor 720 detected a door opening when the monitoring system was armed. The central alarm station server 770 may receive the alarm data and route the alarm data to the terminal 772 for processing by an operator associated with the terminal 772. The terminal 772 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 772 and 774 may be mobile devices or devices designed for a specific function. Although FIG. 7 illustrates two terminals for brevity, actual implementations may include more (and, perhaps, many more) terminals.

The one or more user devices 740, 750 are devices that host and display user interfaces. For instance, the user device 740 is a mobile device that hosts one or more native applications (e.g., the native surveillance application 742). The user device 740 may be a cellular phone or a non-cellular locally networked device with a display. The user device 740 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 740 may perform functions unrelated to the monitoring system, such as placing personal telephone calls, playing music, playing video, displaying pictures, browsing the Internet, maintaining an electronic calendar, etc.

The user device 740 includes a native surveillance application 742. The native surveillance application 742 refers to a software/firmware program running on the corresponding mobile device that enables the user interface and features described throughout. The user device 740 may load or install the native surveillance application 742 based on data received over a network or data received from local media. The native surveillance application 742 runs on mobile devices platforms, such as iPhone, iPod touch, Blackberry, Google Android, Windows Mobile, etc. The native surveillance application 742 enables the user device 740 to receive and process image and sensor data from the monitoring system.

The user device 750 may be a general-purpose computer (e.g., a desktop personal computer, a workstation, or a laptop computer) that is configured to communicate with the monitoring application server 760 and/or the monitoring system control unit 710 over the network 705. The user device 750 may be configured to display a surveillance monitoring user interface 752 that is generated by the user device 750 or generated by the monitoring application server 760. For example, the user device 750 may be configured to display a user interface (e.g., a web page) provided by the monitoring application server 760 that enables a user to perceive images captured by the camera 730 and/or reports related to the monitoring system. Although FIG. 7 illustrates two user devices for brevity, actual implementations may include more (and, perhaps, many more) or fewer user devices.

In some implementations, the one or more user devices 740, 750 communicate with and receive monitoring system data from the monitoring system control unit 710 using the communication link 738. For instance, the one or more user devices 740, 750 may communicate with the monitoring system control unit 710 using various local wireless protocols such as wifi, Bluetooth, zwave, zigbee, HomePlug (ethernet over powerline), or wired protocols such as Ethernet and USB, to connect the one or more user devices 740, 750 to local security and automation equipment. The one or more user devices 740, 750 may connect locally to the monitoring system and its sensors and other devices. The local connection may improve the speed of status and control communications because communicating through the network 705 with a remote server (e.g., the monitoring application server 760) may be significantly slower.

Although the one or more user devices 740, 750 are shown as communicating with the monitoring system control unit 710, the one or more user devices 740, 750 may communicate directly with the sensors and other devices controlled by the monitoring system control unit 710. In some implementations, the one or more user devices 740, 750 replace the monitoring system control unit 710 and perform the functions of the monitoring system control unit 710 for local monitoring and long range/offsite communication.

In other implementations, the one or more user devices 740, 750 receive monitoring system data captured by the monitoring system control unit 710 through the network 705. The one or more user devices 740, 750 may receive the data from the monitoring system control unit 710 through the network 705 or the monitoring application server 760 may relay data received from the monitoring system control unit 710 to the one or more user devices 740, 750 through the network 705. In this regard, the monitoring application server 760 may facilitate communication between the one or more user devices 740, 750 and the monitoring system.

In some implementations, the one or more user devices 740, 750 may be configured to switch whether the one or more user devices 740, 750 communicate with the monitoring system control unit 710 directly (e.g., through link 738) or through the monitoring application server 760 (e.g., through network 705) based on a location of the one or more user devices 740, 750. For instance, when the one or more user devices 740, 750 are located close to the monitoring system control unit 710 and in range to communicate directly with the monitoring system control unit 710, the one or more user devices 740, 750 use direct communication. When the one or more user devices 740, 750 are located far from the monitoring system control unit 710 and not in range to communicate directly with the monitoring system control unit 710, the one or more user devices 740, 750 use communication through the monitoring application server 760.

Although the one or more user devices 740, 750 are shown as being connected to the network 705, in some implementations, the one or more user devices 740, 750 are not connected to the network 705. In these implementations, the one or more user devices 740, 750 communicate directly with one or more of the monitoring system components and no network (e.g., Internet) connection or reliance on remote servers is needed.

In some implementations, the one or more user devices 740, 750 are used in conjunction with only local sensors and/or local devices in a house. In these implementations, the system 700 only includes the one or more user devices 740, 750, the sensors 720, the module 722, the camera 730, and the robotic devices. The one or more user devices 740, 750 receive data directly from the sensors 720, the module 722, the camera 730, and the robotic devices and sends data directly to the sensors 720, the module 722, the camera 730, and the robotic devices. The one or more user devices 740, 750 provide the appropriate interfaces/processing to provide visual surveillance and reporting.

The system 700 may also include a first responder device 790 that includes a first responder application. The first responder device 790 may include a mobile device such as a smartphone, a tablet, a smartwatch, a laptop, or the like. In some implementations, the first responder device 790 may also include a mixed reality device such as mixed reality device 780. The first responder device 790 can be used by a first responder (or other user that is not a property occupant, property owner, or a user that otherwise has access to the one or more components of the system 700). The user such as first responder can use the first responder application 792 installed on the first responder device 790 to request access to one or more other components of the monitoring system 100. In some implementation the monitoring application server 760, the central alarm station server 770, or the like may evaluate the first responder device's 790 request for access to the system 700, authenticate the first responder, provide access to a property's monitoring profile. With access to the property's monitoring profile, first responder can use the first responder application on the first responder device to interact with one or more components of the system 700 during the response to a potential event at the property where the monitor control unit 710, sensors 720, cameras 730, thermostat 734, connected lights, connected locks, or the like are installed.

In some implementations, the monitoring application server 760, the central alarm station server 770, or the like may only provide the first responder device 790 with temporary access to the one or more components of the system 700. For example, the first responder device may only be provided with access to one or more components of the system 700 for the duration of a potential event. Once the system 700 determines that the potential event is no longer occurring, the system 700 can terminate the first responder device's access to the property's monitoring profile, the system 700, or a combination thereof.

In other implementations, the system 700 further includes network 705 and the sensors 720, the module 722, the camera 730, the thermostat 734, and the robotic devices are configured to communicate sensor and image data to the one or more user devices 740, 750 over network 705 (e.g., the Internet, cellular network, etc.). In yet another implementation, the sensors 720, the module 722, the camera 730, the thermostat 734, and the robotic devices 782 (or a component, such as a bridge/router) are intelligent enough to change the communication pathway from a direct local pathway when the one or more user devices 740, 750 are in close physical proximity to the sensors 720, the module 722, the camera 730, the thermostat 734, and the robotic devices to a pathway over network 705 when the one or more user devices 740, 750 are farther from the sensors 720, the module 722, the camera 730, the thermostat 734, and the robotic devices 782. In some examples, the system leverages GPS information from the one or more user devices 740, 750 to determine whether the one or more user devices 740, 750 are close enough to the sensors 720, the module 722, the camera 730, the thermostat 734, and the robotic devices 782 to use the direct local pathway or whether the one or more user devices 740, 750 are far enough from the sensors 720, the module 722, the camera 730, the thermostat 734, and the robotic devices that the pathway over network 705 is required. In other examples, the system leverages status communications (e.g., pinging) between the one or more user devices 740, 750 and the sensors 720, the module 722, the camera 730, the thermostat 734, and the robotic devices 782 to determine whether communication using the direct local pathway is possible. If communication using the direct local pathway is possible, the one or more user devices 740, 750 communicate with the sensors 720, the module 722, the camera 730, the thermostat 734, and the robotic devices 782 using the direct local pathway. If communication using the direct local pathway is not possible, the one or more user devices 740, 750 communicate with the sensors 720, the module 722, the camera 730, the thermostat 734, and the robotic devices 782 using the pathway over network 705.

In some implementations, the system 700 provides end users with access to images captured by the camera 730 to aid in decision making. The system 700 may transmit the images captured by the camera 730 over a wireless WAN network to the user devices 740, 750. Because transmission over a wireless WAN network may be relatively expensive, the system 700 uses several techniques to reduce costs while providing access to significant levels of useful visual information.

In some implementations, a state of the monitoring system and other events sensed by the monitoring system may be used to enable/disable video/image recording devices (e.g., the camera 730). In these implementations, the camera 730 may be set to capture images on a periodic basis when the alarm system is armed in an "Away" state, but set not to capture images when the alarm system is armed in a "Stay" state or disarmed. In addition, the camera 730 may be triggered to begin capturing images when the alarm system detects an event, such as an alarm event, a door opening event for a door that leads to an area within a field of view of the camera 730, or motion in the area within the field of view of the camera 730. In other implementations, the camera 730 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A system comprising:
one or more processors; and
one or more storage devices that include instructions that are operable, when executed by the one or more processors, to cause the one or more processors to perform operations comprising:
obtaining data indicating (i) one or more hazards identified in a property, (ii) a current location of an occupant in the property, and (iii) sensor data collected by one or more devices located in the property;
generating, based on the sensor data, a map of the property to be provided for output on a user device of the occupant, wherein the map comprises one or more interactive graphical markers;
determining a proximity between the current location and each of the one or more hazards;
identifying a set of candidate paths for exiting the property based on proximities determined between the current location and the one or more hazards;
computing, for each candidate path included in the candidate paths, a path score reflecting a predicted safety level associated with navigating along a particular candidate path;
selecting, from among the set of candidate paths, a path to exit the property based on path scores computed for the set of candidate paths; and
providing, for output to the user device, an indication of the one or more interactive graphical markers associated with the path that was selected from the set of candidate paths on the map of the property.

2. The system of claim 1, wherein the one or more hazards are identified based on sensor data collected in real-time by one or more sensors located in the property.

3. The system of claim 2, wherein:
the sensor data comprises image data captured by one or more cameras installed at the property; and
the image data indicates occurrence of a potential event at the property.

4. The system of claim 3, wherein the one or more hazards are identified based on the occurrence of the potential event at the property.

5. The system of claim 1, wherein the operations further comprise:
obtaining data indicating (i) a floor plan of the property and (ii) sensor data collected in real-time by one or more sensors located in the property; and
generating a map of the property based on the floor plan and the sensor data.

6. The system of claim 5, wherein:
providing the indication of the path comprises providing a display of the map through the user device; and
the display comprises a visual overlay of the path on the map.

7. The system of claim 5, wherein the one or more interactive graphical markers comprise a graphical marker projection representing the current location of the occupant inside the property.

8. The system of claim 5, wherein:
the operations further comprise obtaining data indicating occurrence of a potential event at the property; and
the one or more interactive graphical markers comprise (i) a first graphical marker projection representing a location of the potential event in the property, and (ii) a second graphical marker projection representing the current location of the occupant inside the property.

9. The system of claim 1, wherein the operations further comprise:
transmitting a notification to a computing device of a first responder based on identifying the path to exit the property, wherein the notification includes an indication of an occurrence of a potential event at the property.

10. The method of claim 1, wherein the one or more interactive graphical markers enable the occupant to adjust the one or more devices while navigating on the path that was selected from the set of candidate paths.

11. The method of claim 10, wherein:
the one or more devices comprises a lighting device;
the one or more interactive graphical markers comprises a graphical marker corresponding to a projection of the lighting device on the map, wherein a location of the projection on the map corresponds to a physical location of the lighting device within the property; and
the graphical marker corresponding to the projection of the lighting device on the map enables the user to toggle a power of the lighting device.

12. A method comprising:
obtaining data indicating (i) one or more hazards identified in a property, (ii) a current location of an occupant in the property, and (iii) sensor data collected by one or more devices located in the property;
generating, based on the sensor data, a map of the property to be provided for output on a user device of the occupant, wherein the map comprises one or more interactive graphical markers;

determining a proximity between the current location and each of the one or more hazards;

identifying a set of candidate paths for exiting the property based on proximities determined between the current location and the one or more hazards;

computing, for each candidate path included in the candidate paths, a path score reflecting a predicted safety level associated with navigating along a particular candidate path;

selecting, from among the set of candidate paths, a path to exit the property based on path scores computed for the set of candidate paths; and providing, for output to the user device, an indication of the one or more interactive graphical markers associated with the path that was selected from the set of candidate paths on the map of the property.

13. The method of claim 12, wherein the one or more hazards are identified based on sensor data collected in real-time by one or more sensors located in the property.

14. The method of claim 13, wherein:
the sensor data comprises image data captured by one or more cameras installed at the property; and
the image data indicates occurrence of a potential event at the property.

15. The method of claim 14, wherein the one or more hazards are identified based on the occurrence of the potential event at the property.

16. The method of claim 12, further comprising:
obtaining data indicating (i) a floor plan of the property and (ii) sensor data collected in real-time by one or more sensors located in the property; and
generating a map of the property based on the floor plan and the sensor data.

17. At least one non-transitory computer-readable storage device storing instructions that are operable, when executed by one or more processors, to cause the one or more processors to perform operations comprising:

obtaining data indicating (i) one or more hazards identified in a property, (ii) a current location of an occupant in the property, and (iii) sensor data collected by one or more devices located in the property;

generating, based on the sensor data, a map of the property to be provided for output on a user device of the occupant, wherein the map comprises one or more interactive graphical markers;

determining a proximity between the current location and each of the one or more hazards;

identifying a set of candidate paths for exiting the property based on proximities determined between the current location and the one or more hazards;

computing, for each candidate path included in the candidate paths, a path score reflecting a predicted safety level associated with navigating along a particular candidate path;

selecting, from among the set of candidate paths, a path to exit the property based on path scores computed for the set of candidate paths; and providing, for output to the user device, an indication of the one or more interactive graphical markers associated with the path that was selected from the set of candidate paths on the map of the property.

18. The at least one non-transitory computer-readable storage device of claim 17, wherein the one or more hazards are identified based on sensor data collected in real-time by one or more sensors located in the property.

19. The at least one non-transitory computer-readable storage device of claim 18, wherein:
the sensor data comprises image data captured by one or more cameras installed at the property; and
the image data indicates occurrence of a potential event at the property.

20. The at least one non-transitory computer-readable storage device of claim 17, wherein: providing the indication of the path comprises providing a display of the map through the user device; and the display comprises a visual overlay of the path on the map.

* * * * *